(12) United States Patent
Ording et al.

(10) Patent No.: US 9,542,081 B2
(45) Date of Patent: Jan. 10, 2017

(54) METHODS AND APPARATUSES FOR OPERATING A DATA PROCESSING SYSTEM

(71) Applicant: APPLE INC., Cupertino, CA (US)

(72) Inventors: Bas Ording, San Francisco, CA (US); Donald Lindsay, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/204,977

(22) Filed: Mar. 11, 2014

(65) Prior Publication Data

US 2014/0208250 A1  Jul. 24, 2014

Related U.S. Application Data

(63) Continuation of application No. 14/096,717, filed on Dec. 4, 2013, which is a continuation of application No. 10/873,661, filed on Jun. 21, 2004, now abandoned.

(51) Int. Cl.

| | |
|---|---|
| *G06F 3/00* | (2006.01) |
| *G06F 3/0484* | (2013.01) |
| *G06F 3/0486* | (2013.01) |
| *G06F 3/0482* | (2013.01) |
| *G06F 3/0488* | (2013.01) |
| *G06F 3/0481* | (2013.01) |
| *G06F 3/048* | (2013.01) |

(52) U.S. Cl.
CPC .......... *G06F 3/0484* (2013.01); *G06F 3/0482* (2013.01); *G06F 3/0486* (2013.01); *G06F 3/04817* (2013.01); *G06F 3/04883* (2013.01); *G06F 2203/04803* (2013.01)

(58) Field of Classification Search
CPC ....................................... G06F 3/0481–3/0489
USPC ..................... 715/767–768, 810, 808, 866
See application file for complete search history.

(56) References Cited

U.S. PATENT DOCUMENTS

| | | | |
|---|---|---|---|
| 4,464,652 | A | 8/1984 | Atkinson |
| 4,555,775 | A | 11/1985 | Pike |
| 4,653,020 | A | 3/1987 | Cheselka et al. |

(Continued)

FOREIGN PATENT DOCUMENTS

| | | |
|---|---|---|
| EP | 0483777 | 5/1992 |
| EP | 0514307 A3 | 11/1992 |

(Continued)

OTHER PUBLICATIONS

Anderson et.al. "Show Me Mac OS X, v 10.3 Panther" Apr. 2, 2004.*

(Continued)

*Primary Examiner* — Steven B Theriault
(74) *Attorney, Agent, or Firm* — Morgan, Lewis & Bockius LLP

(57) ABSTRACT

Methods and apparatuses for operating data processing systems. One exemplary method of operating a data processing system which includes a display device includes receiving an input from a user, the input specifying an object to be represented in a user configurable portion of a window which is displayable on a display device, and displaying the window with the user configurable portion wherein the user configurable portion is present in an open interface window or a save interface window. Other methods are also described, and data processing systems are also described.

25 Claims, 30 Drawing Sheets

(56) References Cited

U.S. PATENT DOCUMENTS

| | | | |
|---|---|---|---|
| 4,688,167 A | 8/1987 | Agarwal | |
| 4,689,737 A | 8/1987 | Grant | |
| 4,712,191 A | 12/1987 | Penna | |
| RE32,632 E | 3/1988 | Atkinson | |
| 4,769,636 A | 9/1988 | Iwami et al. | |
| 4,780,709 A | 10/1988 | Randall | |
| 4,783,648 A | 11/1988 | Homma et al. | |
| 4,819,189 A | 4/1989 | Kikuchi et al. | |
| 4,831,556 A | 5/1989 | Oono | |
| 4,862,389 A | 8/1989 | Takagi | |
| 4,899,136 A | 2/1990 | Beard et al. | |
| 5,008,853 A | 4/1991 | Bly et al. | |
| 5,040,131 A | 8/1991 | Torres | |
| 5,060,170 A | 10/1991 | Bourgeois et al. | |
| 5,107,443 A | 4/1992 | Smith et al. | |
| 5,140,677 A * | 8/1992 | Fleming et al. | 715/835 |
| 5,140,678 A | 8/1992 | Torres | |
| 5,146,556 A | 9/1992 | Hullot et al. | |
| 5,202,828 A | 4/1993 | Vertelney et al. | |
| 5,293,476 A | 3/1994 | Wolber et al. | |
| 5,305,435 A | 4/1994 | Bronson | |
| 5,313,575 A | 5/1994 | Beethe | |
| 5,325,481 A | 6/1994 | Hunt | |
| 5,343,409 A | 8/1994 | Satterfield et al. | |
| 5,347,628 A | 9/1994 | Brewer | |
| 5,371,844 A | 12/1994 | Andrew et al. | |
| 5,384,911 A | 1/1995 | Bloomfield | |
| 5,386,564 A | 1/1995 | Shearer et al. | |
| 5,412,776 A | 5/1995 | Bloomfield et al. | |
| 5,422,993 A * | 6/1995 | Fleming | 715/835 |
| 5,428,734 A * | 6/1995 | Haynes et al. | 715/835 |
| 5,438,662 A * | 8/1995 | Randall | 715/776 |
| 5,442,795 A * | 8/1995 | Levine et al. | 715/775 |
| 5,546,520 A | 8/1996 | Cline et al. | |
| 5,546,527 A * | 8/1996 | Fitzpatrick | G06F 3/0486 365/185.21 |
| 5,579,469 A | 11/1996 | Pike | |
| 5,583,984 A | 12/1996 | Conrad et al. | |
| 5,598,524 A * | 1/1997 | Johnston et al. | 715/769 |
| 5,638,504 A * | 6/1997 | Scott et al. | 715/202 |
| 5,638,505 A * | 6/1997 | Hemenway et al. | 715/769 |
| 5,652,876 A * | 7/1997 | Ashe et al. | 703/26 |
| 5,657,049 A | 8/1997 | Ludolph et al. | |
| 5,657,463 A | 8/1997 | Bingham | |
| 5,680,562 A | 10/1997 | Conrad et al. | |
| 5,714,971 A * | 2/1998 | Shalit et al. | 715/804 |
| 5,724,532 A * | 3/1998 | Thomson | 719/329 |
| 5,737,737 A | 4/1998 | Hikida et al. | |
| 5,742,286 A * | 4/1998 | Kung et al. | 715/839 |
| 5,745,096 A | 4/1998 | Ludolph et al. | |
| 5,745,111 A * | 4/1998 | Cline et al. | 715/769 |
| 5,751,287 A * | 5/1998 | Hahn et al. | 715/775 |
| 5,754,174 A | 5/1998 | Carpenter et al. | |
| 5,754,178 A * | 5/1998 | Johnston et al. | 715/769 |
| 5,760,775 A * | 6/1998 | Sklut et al. | 715/839 |
| 5,767,834 A | 6/1998 | Vouri et al. | |
| 5,771,032 A | 6/1998 | Cline et al. | |
| 5,801,702 A * | 9/1998 | Dolan et al. | 715/854 |
| 5,825,348 A | 10/1998 | Ludolph et al. | |
| 5,825,349 A | 10/1998 | Meier et al. | |
| 5,835,094 A * | 11/1998 | Ermel et al. | 715/848 |
| 5,886,697 A | 3/1999 | Naughton et al. | |
| 5,956,030 A * | 9/1999 | Conrad | G06F 3/0481 715/769 |
| 5,999,178 A * | 12/1999 | Hwang et al. | 715/787 |
| 6,034,621 A * | 3/2000 | Kaufman | 340/7.21 |
| 6,061,061 A | 5/2000 | Conrad et al. | |
| 6,097,389 A | 8/2000 | Morris et al. | |
| 6,121,967 A | 9/2000 | Foster et al. | |
| 6,133,898 A | 10/2000 | Ludolph et al. | |
| 6,147,687 A * | 11/2000 | Wanderski | 715/853 |
| 6,177,935 B1 * | 1/2001 | Munn | 715/769 |
| 6,188,404 B1 * | 2/2001 | Rekimoto | 715/764 |
| 6,195,094 B1 | 2/2001 | Celebiler | |
| 6,208,344 B1 | 3/2001 | Holzman et al. | |
| 6,225,920 B1 * | 5/2001 | Dayle | 341/21 |
| 6,252,597 B1 | 6/2001 | Lokuge | |
| 6,295,541 B1 * | 9/2001 | Bodnar et al. | |
| 6,307,545 B1 | 10/2001 | Conrad et al. | |
| 6,310,633 B1 | 10/2001 | Graham | |
| 6,317,739 B1 * | 11/2001 | Hirata et al. | |
| 6,335,742 B1 * | 1/2002 | Takemoto | G06F 17/30274 386/225 |
| 6,341,280 B1 | 1/2002 | Glass et al. | |
| 6,356,915 B1 | 3/2002 | Chtchetkine et al. | |
| 6,356,971 B1 | 3/2002 | Katz et al. | |
| 6,363,400 B1 | 3/2002 | Chtchetkine et al. | |
| 6,411,311 B1 | 6/2002 | Rich et al. | |
| 6,430,576 B1 * | 8/2002 | Gates et al. | |
| 6,433,801 B1 * | 8/2002 | Moon et al. | 715/840 |
| 6,470,341 B1 * | 10/2002 | Rekimoto | |
| 6,496,206 B1 * | 12/2002 | Mernyk et al. | 715/835 |
| 6,546,393 B1 * | 4/2003 | Khan | |
| 6,571,245 B2 * | 5/2003 | Chun et al. | |
| 6,590,568 B1 * | 7/2003 | Astala | G06F 3/0486 178/18.01 |
| 6,636,250 B1 | 10/2003 | Gasser | |
| 6,642,944 B2 | 11/2003 | Conrad et al. | |
| 6,664,983 B2 | 12/2003 | Ludolph | |
| 6,691,138 B1 | 2/2004 | Kirkpatrick et al. | |
| 6,711,291 B1 | 3/2004 | Stubler et al. | |
| 6,741,996 B1 | 5/2004 | Brechner et al. | |
| 6,750,886 B1 | 6/2004 | Bergstedt | |
| 6,751,604 B2 | 6/2004 | Barney et al. | |
| 6,784,925 B1 | 8/2004 | Tomat et al. | |
| 6,823,344 B1 | 11/2004 | Isensee et al. | |
| 6,823,348 B2 | 11/2004 | Michel et al. | |
| 6,859,210 B2 | 2/2005 | Luo et al. | |
| 6,910,052 B2 * | 6/2005 | Gates et al. | |
| 6,915,489 B2 | 7/2005 | Gargi | |
| 6,924,827 B1 | 8/2005 | Gulati et al. | |
| 6,928,621 B2 * | 8/2005 | Conrad et al. | 715/769 |
| 6,956,562 B1 * | 10/2005 | O'Hara et al. | 345/173 |
| 6,966,033 B1 | 11/2005 | Gasser et al. | |
| 7,089,256 B2 * | 8/2006 | Smialek | 717/104 |
| 7,096,454 B2 * | 8/2006 | Damm et al. | 717/105 |
| 7,117,453 B2 | 10/2006 | Drucker et al. | |
| 7,120,735 B1 * | 10/2006 | Summers et al. | 711/111 |
| 7,149,729 B2 | 12/2006 | Kaasten et al. | |
| 7,162,466 B2 | 1/2007 | Kaasten et al. | |
| 7,171,468 B2 | 1/2007 | Yeung et al. | |
| 7,293,242 B2 * | 11/2007 | Cossey et al. | 715/770 |
| 7,320,109 B1 | 1/2008 | Zeevi et al. | |
| 7,334,190 B2 | 2/2008 | Wierowski | |
| 7,337,409 B2 * | 2/2008 | Doblmayr et al. | 715/769 |
| 7,346,766 B2 * | 3/2008 | Mackin et al. | 713/100 |
| 7,353,232 B1 * | 4/2008 | Kalucha et al. | 705/64 |
| 7,434,170 B2 * | 10/2008 | Novak et al. | 715/764 |
| 7,461,346 B2 * | 12/2008 | Fildebrandt | 715/747 |
| 7,472,350 B2 * | 12/2008 | Hintermeister et al. | 715/736 |
| 7,496,583 B2 | 2/2009 | Moore et al. | |
| 7,549,126 B2 | 6/2009 | Conrad et al. | |
| 7,565,618 B2 * | 7/2009 | Sheasby et al. | 715/769 |
| 7,607,102 B2 * | 10/2009 | Ording et al. | 715/769 |
| 7,665,028 B2 * | 2/2010 | Cummins et al. | 715/769 |
| 7,739,604 B1 * | 6/2010 | Lyons et al. | 715/736 |
| 7,788,579 B2 | 8/2010 | Berkner et al. | |
| 7,956,845 B2 * | 6/2011 | Lee | 345/173 |
| 7,958,119 B2 | 6/2011 | Eggink et al. | |
| 8,050,496 B2 | 11/2011 | Pan et al. | |
| 8,181,119 B1 | 5/2012 | Ording | |
| 8,589,492 B2 * | 11/2013 | Scholz | 709/206 |
| 8,645,489 B1 | 2/2014 | Riggins et al. | |
| 8,650,500 B2 * | 2/2014 | Soderberg et al. | 715/770 |
| 2001/0018715 A1 * | 8/2001 | Stern et al. | 709/313 |
| 2001/0024212 A1 | 9/2001 | Ohnishi | 345/769 |
| 2001/0042042 A1 * | 11/2001 | Stokes et al. | 705/42 |
| 2002/0018051 A1 * | 2/2002 | Singh | 345/173 |
| 2002/0059288 A1 * | 5/2002 | Yagi et al. | 707/102 |
| 2002/0075312 A1 | 6/2002 | Amadio et al. | |
| 2002/0075330 A1 | 6/2002 | Rosenzweig et al. | |
| 2002/0091697 A1 * | 7/2002 | Huang | G06F 17/30867 |
| 2002/0097277 A1 | 7/2002 | Pitroda | |
| 2002/0107892 A1 * | 8/2002 | Chittu et al. | 707/514 |

(56) References Cited

U.S. PATENT DOCUMENTS

| | | | |
|---|---|---|---|
| 2002/0154176 A1* | 10/2002 | Barksdale et al. | 345/853 |
| 2002/0161777 A1* | 10/2002 | Smialek | 707/102 |
| 2002/0196271 A1* | 12/2002 | Windl et al. | 345/734 |
| 2002/0198909 A1 | 12/2002 | Huynh et al. | |
| 2003/0007007 A1* | 1/2003 | Hinegardner et al. | 345/769 |
| 2003/0050713 A1* | 3/2003 | Piersanti et al. | 700/1 |
| 2003/0063126 A1 | 4/2003 | Yanchar et al. | |
| 2003/0069931 A1* | 4/2003 | Omura | G06F 3/0481 709/205 |
| 2003/0076322 A1* | 4/2003 | Ouzts et al. | 345/440 |
| 2003/0079038 A1* | 4/2003 | Robbin et al. | 709/232 |
| 2003/0081011 A1 | 5/2003 | Sheldon et al. | |
| 2003/0084096 A1 | 5/2003 | Starbuck et al. | |
| 2003/0093466 A1* | 5/2003 | Jarman et al. | 709/203 |
| 2003/0107601 A1* | 6/2003 | Ryzhov | 345/769 |
| 2003/0126136 A1 | 7/2003 | Omoigui | |
| 2003/0158975 A1* | 8/2003 | Frank et al. | 709/331 |
| 2003/0160825 A1* | 8/2003 | Weber | G06F 3/0486 715/769 |
| 2003/0184587 A1* | 10/2003 | Ording et al. | 345/769 |
| 2003/0190590 A1* | 10/2003 | Lumsden et al. | 434/118 |
| 2003/0222913 A1* | 12/2003 | Mattila | G06F 3/0486 715/764 |
| 2003/0222915 A1* | 12/2003 | Marion et al. | 345/769 |
| 2004/0004638 A1 | 1/2004 | Babaria | |
| 2004/0021643 A1* | 2/2004 | Hoshino | G06F 3/016 345/173 |
| 2004/0044723 A1* | 3/2004 | Bell et al. | 709/203 |
| 2004/0056839 A1* | 3/2004 | Yoshihara | 345/156 |
| 2004/0070608 A1* | 4/2004 | Saka | 345/748 |
| 2004/0095390 A1* | 5/2004 | Arning et al. | 345/769 |
| 2004/0119763 A1* | 6/2004 | Mizobuchi et al. | 345/863 |
| 2004/0177319 A1* | 9/2004 | Horn | 715/501.1 |
| 2004/0189695 A1 | 9/2004 | Kurtz et al. | |
| 2004/0205711 A1* | 10/2004 | Ishimitsu | G06F 9/4443 717/116 |
| 2004/0220899 A1 | 11/2004 | Barney et al. | |
| 2005/0050301 A1 | 3/2005 | Whittle et al. | |
| 2005/0071780 A1 | 3/2005 | Muller et al. | |
| 2005/0076305 A1* | 4/2005 | Hintermeister et al. | 715/733 |
| 2005/0080807 A1 | 4/2005 | Beilinson et al. | |
| 2005/0097477 A1 | 5/2005 | Camara et al. | |
| 2005/0108297 A1* | 5/2005 | Rollin et al. | 707/201 |
| 2005/0132304 A1* | 6/2005 | Guido et al. | 715/853 |
| 2005/0165825 A1* | 7/2005 | Turski et al. | 707/102 |
| 2005/0188174 A1 | 8/2005 | Guzak et al. | |
| 2005/0197961 A1 | 9/2005 | Miller et al. | |
| 2005/0246313 A1 | 11/2005 | Turski et al. | |
| 2005/0246637 A1 | 11/2005 | Knight et al. | |
| 2005/0246640 A1 | 11/2005 | Lacy | |
| 2005/0246721 A1* | 11/2005 | Scholz | 719/320 |
| 2005/0275636 A1* | 12/2005 | Dehlin et al. | 345/173 |
| 2006/0036568 A1 | 2/2006 | Moore et al. | |
| 2006/0070007 A1* | 3/2006 | Cummins et al. | 715/769 |
| 2006/0146765 A1* | 7/2006 | Van De Sluis | G06F 3/016 370/338 |
| 2006/0174216 A1 | 8/2006 | Peterson et al. | |
| 2006/0195462 A1 | 8/2006 | Rogers | |
| 2006/0259875 A1 | 11/2006 | Collins et al. | |
| 2006/0282790 A1 | 12/2006 | Matthews et al. | |
| 2006/0294476 A1 | 12/2006 | Buckley | |
| 2007/0038610 A1 | 2/2007 | Omoigui | |
| 2007/0081197 A1 | 4/2007 | Omoigui | |
| 2007/0088672 A1 | 4/2007 | Kaasten et al. | |
| 2007/0168388 A1 | 7/2007 | Plastina et al. | |
| 2007/0186241 A1 | 8/2007 | Sugimoto et al. | |
| 2007/0256009 A1 | 11/2007 | Jung | |
| 2008/0036743 A1* | 2/2008 | Westerman et al. | 345/173 |
| 2008/0052371 A1 | 2/2008 | Partovi et al. | |
| 2008/0120501 A1 | 5/2008 | Jannink et al. | |
| 2008/0177640 A1 | 7/2008 | Gokturk et al. | |
| 2008/0189656 A1 | 8/2008 | Abanami et al. | |
| 2008/0227440 A1 | 9/2008 | Settepalli | |
| 2009/0049082 A1 | 2/2009 | Slaney et al. | |
| 2009/0150388 A1 | 6/2009 | Roseman et al. | |
| 2009/0178008 A1 | 7/2009 | Herz et al. | |
| 2010/0042654 A1 | 2/2010 | Heller et al. | |
| 2010/0076983 A1 | 3/2010 | Gates et al. | |
| 2010/0088605 A1 | 4/2010 | Livshin et al. | |
| 2010/0092085 A1 | 4/2010 | Marchesotti | |
| 2010/0185671 A1 | 7/2010 | Burba et al. | |
| 2010/0246591 A1 | 9/2010 | Gobriel et al. | |
| 2011/0216966 A1 | 9/2011 | Cok et al. | |
| 2011/0234613 A1 | 9/2011 | Hanson et al. | |
| 2011/0246939 A1 | 10/2011 | Kasahara et al. | |
| 2011/0252346 A1 | 10/2011 | Chaudhri | |
| 2011/0252349 A1 | 10/2011 | Chaudhri | |
| 2011/0252350 A1 | 10/2011 | Chaudhri | |
| 2011/0252372 A1 | 10/2011 | Chaudhri | |
| 2011/0252373 A1 | 10/2011 | Chaudhri | |
| 2011/0252374 A1 | 10/2011 | Chaudhri | |
| 2011/0252375 A1 | 10/2011 | Chaudhri | |
| 2011/0265035 A1 | 10/2011 | Lepage et al. | |
| 2012/0027294 A1 | 2/2012 | Krolczyk et al. | |
| 2012/0030005 A1 | 2/2012 | Gupta | |
| 2012/0036139 A1 | 2/2012 | Okamoto et al. | |
| 2012/0054666 A1 | 3/2012 | Baird-Smith et al. | |
| 2012/0072832 A1 | 3/2012 | Tanaka | |
| 2012/0143718 A1 | 6/2012 | Graham et al. | |
| 2012/0299942 A1 | 11/2012 | Braun et al. | |
| 2012/0313962 A1 | 12/2012 | Hsu et al. | |
| 2012/0317123 A1 | 12/2012 | Green et al. | |
| 2013/0044123 A1 | 2/2013 | Shah et al. | |
| 2013/0057566 A1 | 3/2013 | Kriese et al. | |
| 2013/0066819 A1 | 3/2013 | Nice et al. | |
| 2014/0025619 A1 | 1/2014 | Michelstein et al. | |
| 2014/0075313 A1 | 3/2014 | Bachman et al. | |
| 2014/0075314 A1 | 3/2014 | Bachman et al. | |
| 2014/0075324 A1 | 3/2014 | Howard et al. | |
| 2014/0223357 A1 | 8/2014 | Ording et al. | |

FOREIGN PATENT DOCUMENTS

| | | |
|---|---|---|
| FR | 2693810 | 6/1991 |
| TW | 201135578 A | 10/2011 |
| WO | WO 89/11694 | 11/1989 |
| WO | WO 2007119927 A1 | 10/2007 |
| WO | WO 2011109181 A1 | 9/2011 |

OTHER PUBLICATIONS

Shebanek et. al. "The complete guide to the nextstep user environment", 1993 pp. 1-114.*

"Automatic Window Management Mode", IBM Technical Disclosure Bulletin, vol. 35, No. 4B, p. 331 Sep. 1992.

"Developer's Desktop," IBM Tech. Disclosure, vol. 33, No. 6B, Nov. 1990, pp. 114-117.

"Notebook Tabs as Target Location for Drag/Drop Operations", IBM Technical Disclosure Bulletin, vol. 35, No. 7, Dec. 1992, p. 207.

"Preliminary Research Report," No. 9206603000, INPI, Feb. 2, 1996.

"Using Desk Top and Drawers to Predefine Paths," Research Disclosure, No. 312, Apr. 1990, p. 298.

"Virtual Office Desktop Drawers," Research Disclosure, No. 305, Sep. 1989, p. 651.

Apple Computer, "Inside Macintosh", Apple Technical Library, Chapter 6, Dec. 1992, pp. 107-130.

Cowart, Robert. Mastering Windows 3.1. Sybex Inc., 1992, pp. 7-30, 52-57 and 149-162.

Duntemann, Jeff, "Complete Turbo Pascal," 1989, Scott, Foresman and Company, Third Edition, pp. 528-548.

Johnson, Jeff et al., "The Xerox Star: A Retrospective", Computer, Sep. 1989, pp. 11-27.

Johnston, R., "Window Shade Version 1.1 Program", Interactive Technologies, Inc., Stuart, Florida, 1989, 2 pages.

Lam et al., "The NewWave Office," Hewlett-Packard Journal, Aug. 1990, vol. 40, No. 4, p. 23-31.

Mander, Richard et al., "A 'Pile' Metaphor for Supporting Casual Organization of Information", ACM Conference on Human Factors

(56) References Cited

OTHER PUBLICATIONS in Computing Systems (CHI '92 Conference Proceedings): Striking a Balance (May 3-7, 1992), pp. 627-634 Monterey (US).
Myers, Brad A, "Window Interfaces, A Taxonomy of Window Manager User Interfaces", IEEE Computer Graphics and Applications, Sep. 1988, pp. 65-83.
The NeXT™ "User's Reference Manual," c1989 by NeXT™, Inc., pp. 10-12,99-102.
Tyne, Maria E. "Thinking Person's Guide to OS.2 2.1," John Wiley & Sons Inc., 1993, pp. 5-12.
"Microsoft Windows™ User Guide", Microsoft Corporation, 1985-1990 Version 3.0, p. 97.
"Microsoft Windows Program Manager," Screen Dumps from Microsoft Windows™ v3.1, Microsoft Corporation 1985-1992, pp. 1-14.
Shebanek et al. "The complete guide to the NextStep operating environment" 1993.
Wikipedia.org. "Macintosh Finder Software" Retrieved from the Internet Jul. 2009.
www.cocoatech.com et al. "Pathfinder" May 2004 printed from http://web.archive.org/web/20040505134139/cocoatech.com/manual/html/flash.html.
Williams, Robin et al. "The Robin Williams MAC OS X book, Jaguar edition" Dec. 26, 2002.
Pogue et al. "MacOSX: The Missing Manual, Panther Edition" 2003.
Office Action, dated Jun. 27, 2007, received in U.S. Appl. No. 10/873,661, 18 pages.
Office Action, dated Dec. 31, 2007, received in U.S. Appl. No. 10/873,661, 17 pages.
Final Office Action, dated Jul. 10, 2008, received in U.S. Appl. No. 10/873,661, 22 pages.
Office Action, dated Feb. 17, 2009, received in U.S. Appl. No. 10/873,661, 23 pages.
Office Action, dated Aug. 3, 2009, received in U.S. Appl. No. 10/873,661, 23 pages.
Final Office Action, dated Mar. 8, 2010, received in U.S. Appl. No. 10/873,661, 29 pages.
Office Action, dated Jun. 7, 2013, received in U.S. Appl. No. 10/873,661, 10 pages.
Office Action, dated Apr. 23, 2015, received in U.S. Appl. No. 14/096,717, 7 pages.
U.S. Appl. No. 14/096,717, filed Dec. 4, 2013, 54 pages.
Cohen, et al., "Color Harmonization," Tel Aviv University, Jan. 1, 2006, 7 pages.
Conner, "Using iTunes 10," Feb. 2011, Que Publishing, 19 pages.
Dong, "Chameleon: Color Transformation on OLED Displays," Department of Electrical & Computer Engineering, Rice University, Houston TX, May 2012, 1 page.
International Search Report and Written Opinion, dated Jan. 2, 2014, received in International Patent Application No. PCT/US2013/054364, 12 pages.
International Preliminary Report on Patentability, dated Mar. 17, 2015, received in International Patent Application No. PCT/US2013/054364, 9 pages.
Meier, "ACE: A Color Expert System for User Interface Design," Department of Comuper Science; Brown University, Jan. 3, 1988, 12 pages.
Office Action, dated Jun. 18, 2015, received in U.S. Appl. No. 13/893,031, 13 pages.
Office Action, dated May 20, 2015, received in Taiwanese Patent Application No. 102131693, 4 pages.
Tanner, "iTunes Guide, A beginners guide to the iTunes," the Maccast Lemon Productions, Dec. 14, 2006, 3 pages.
Viticci, "Web-based, Social iTunes Store Launching Next Week?", MacStories, http://www.macstories.net/news/web-based-social-itunes-store-launching-next-week/>, Aug. 26, 2010, 4 pages.
Office Action, dated Jul. 2, 2015, received in U.S. Appl. No. 13/890,888, 19 pages.
Office Action, dated Apr. 9, 2015, received in U.S. Appl. No. 13/893,072, 31 pages.
Notice of Allowance, dated Aug. 21, 2015, received in U.S. Appl. No.13/893,072, 7 pages.
Ray et al., "Mac OS X: Unleashed," USA, Nov. 2001, 182 pages.
Final Office Action, dated Feb. 1, 2016, received in U.S. Appl. No. 14/096,717, 15 pages.
Chavanu, "Use iTunes Genius Mixes as Your Personal Music DJ," http://www.makeuseof.com/tag/itunesgeniusmixespersonalmusicdj/>, Aug. 18, 2010, 6 pages.
Final Office Action, dated Mar. 10, 2016, received in U.S. Appl. No. 13/890,888, 15 pages.
Notice of Allowance, dated Sep. 26, 2016, received in received in U.S. Appl. No. 14/096,717, 8 pages.
Notice of Allowance, dated Sep. 23, 2016, received in U.S. Appl. No. 13/890,888, 12 pages.

\* cited by examiner

FIG. 1C

METHODS AND APPARATUSES FOR OPERATING A DATA PROCESSING SYSTEM

CROSS-REFERENCES TO RELATED APPLICATIONS

This application is a continuation of U.S. patent application Ser. No. 14/096,717, filed on Dec. 4, 2013, which is a continuation of U.S. patent application Ser. No. 10/873,661, filed on Jun. 21, 2004, the entirety of which are incorporated by reference herein.

FIELD OF THE INVENTION

The present invention relates to methods for operating a data processing system which includes a display device.

BACKGROUND OF THE INVENTION

Data processing systems, such as general purpose computer systems, often include a display device which can provide the user with a graphical user interface that can be used to operate the computer system. Examples of such graphical user interfaces include Mac OS X from Apple Computer, Inc. of Cupertino, Calif., and Windows XP from Microsoft of Redmond, Wash. Both of these user interfaces provide a file management system user interface as well as a user interface for opening or saving documents. In the case of the Macintosh operating system, the file management system user interface is typically a program referred to as the "Finder." This program allows a user to copy files, move subdirectories (e.g. a folder) from one subdirectory to another subdirectory, to create subdirectories such as folders and to rename or remove the subdirectories and to launch application programs (e.g. launch a word processing program), either by opening a file or opening the application program itself. Moreover, files may be moved between subdirectories or deleted or renamed or duplicated using the Finder program. The Windows Explorer program which operates on the Windows XP operating system provides similar functionality. Both programs display the information concerning files and subdirectories (such as folders) in moveable windows which may be resized or minimized or closed. Multiple windows may be displayed at once and the windows may be overlapping or tiled and they may be moved around the display area.

Using either of these programs, a user may browse or search through the directories or subdirectories and storage media, such as hard disks, or removable media such as optical media (such as a CD or DVD).

FIG. 9A shows an example of a prior art window in the Jaguar version of the Macintosh OS X (10.2) user interface. The window 901 includes a tool bar region 903 and an icon display region 902 which displays the contents of a particular subdirectory or group of subdirectories as selected by a user. The particular view shown in FIG. 9A is an icon view selected by clicking or selecting the button 904 shown in the window 901. The window 901 also includes a resizing control 907 which may be dragged in a known manner to change the size of the window 901. Further, the window 901 also includes view buttons 905 and 906 which may be selected by a user to show either a list view or a column view, respectively. The window also includes a close button 909, a minimize button 910 and a maximize button 911. The tool bar region 903 provides the user with the ability to drag objects, such as files or folders or application programs, into the tool bar region. For example, a user may drag the Pictures folder into the tool bar region 903 or may drag a particular document or file (such as a word processing document) into the tool bar region 903. This allows the user to obtain access to a particular folder or file by just selecting (e.g. "clicking") the object which has been dragged into the tool bar region. Upon selecting an object or icon in the tool bar region, the contents of that object are displayed within the region 902. For example, if the user has dragged the Pictures folder from the region 902 into the tool bar region 903, then a selection or clicking of the Pictures folder in the tool bar region 903 will cause the contents (in this case, 8 items) of the Pictures folder to be displayed within the region 902. The ability to place objects in the tool bar region is limited to the Finder in the Jaguar operating system, and a user customizable system does not appear in an open user interface window or a save user interface window. Further, the tool bar region as shown in FIG. 9A is not scrollable, although additional items may be accessed by selecting the double arrow in the far right of the tool bar region 903.

FIG. 9B shows another example of a user interface of a file management system, which in this case is the Windows Explorer program on a Windows operating system. The Windows Explorer window 925 includes a left portion 927 and a right portion 929. The left portion 927 displays the various media and directories and subdirectories which are accessible by the system. This region is not user customizable but reflects the actual folders and files and drives which are available to the system. The region 929 shows the contents of a particular folder or subdirectory which has been selected in the left portion 927.

While these foregoing systems provide great power and flexibility to a user, it can at times be difficult for a user to find a particular file or folder.

BRIEF SUMMARY OF THE INVENTION

Methods and apparatuses for operating a data processing system having a display device are described herein. These methods and apparatuses, at least in many exemplary embodiments, allow a user to have direct access to a set of directories, application programs, documents, etc. that a user defines as important, frequently accessed or a favorite. This makes the system more convenient and efficient.

In one aspect of the invention, an exemplary method includes receiving an input from a user, the input specifying an object (e.g. a folder) to be represented in a user configurable portion of a window which is displayable on a display device and displaying the window with the user configurable portion wherein the user configurable portion is present in an open user interface window or a save user interface window or a print interface window. In this particular example, a user may select the object (e.g. the folder) within the open or save or print user interface window to cause the contents of that object to be displayed within the open or save or print user interface window. Multiple such objects may be placed within the user configurable portion and may be used within this user configurable portion.

In another aspect of the invention, an exemplary method for operating a data processing system having a display device includes receiving an input from a user, the input specifying an object (e.g. a folder) to be represented in a user configurable portion of a window which is displayable on the display device and displaying the window with the user configurable portion wherein the window is capable of displaying files and representations of subdirectories in a file management system user interface and wherein an application program can be launched by opening a displayed file and wherein the display of the user configurable portion is capable of being scrolled. In this particular example, a user may operate a file management system user interface which includes multiple objects placed by the user in the user configurable portion.

In yet another aspect of the invention, an exemplary method for operating a data processing system having a display device includes receiving an input from the user, the input specifying an object (e.g. a folder) to be represented in a user configurable portion of a window which is displayable on a display device and displaying the window with the user configurable portion wherein the window is capable of displaying files and representations of subdirectories in a file management system user interface and wherein an application program can be launched by opening a displayed file and wherein at least one object, which represents a subdirectory, in the user configurable portion is capable of being opened by selecting an item and commanding the object to be opened while the item is selected. In one particular example of this method, the object is a spring-loaded folder within the user configurable portion.

The present invention also includes apparatuses which perform these methods, including data processing systems which perform these methods, and computer readable or machine readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 1B, 1C and 1D show various windows according to one embodiment of the invention.

DETAILED DESCRIPTION OF THE INVENTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2003.

Figure 1A:
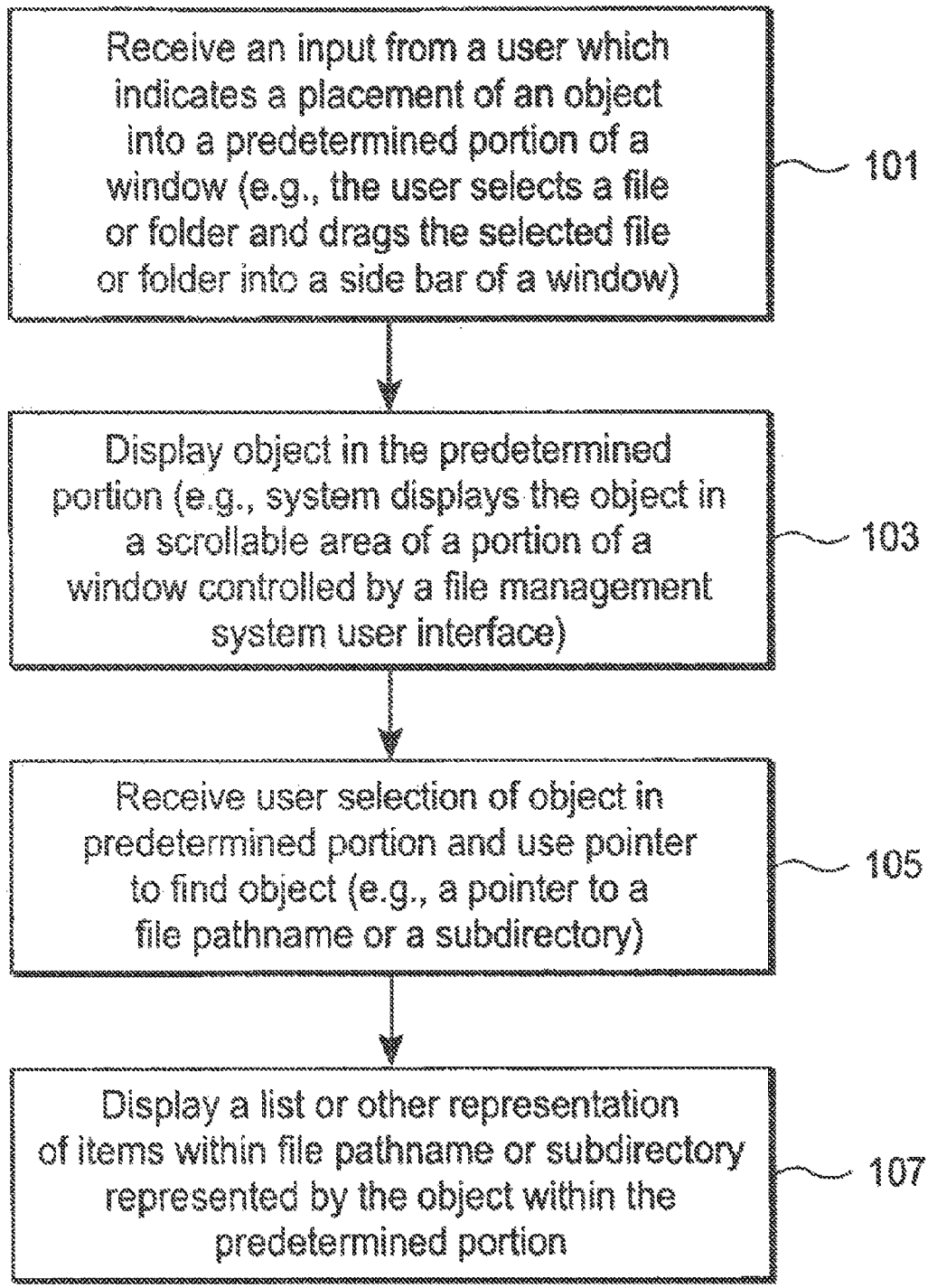
FIG. 1A shows a method of operating a data processing system.
Figure 1B:
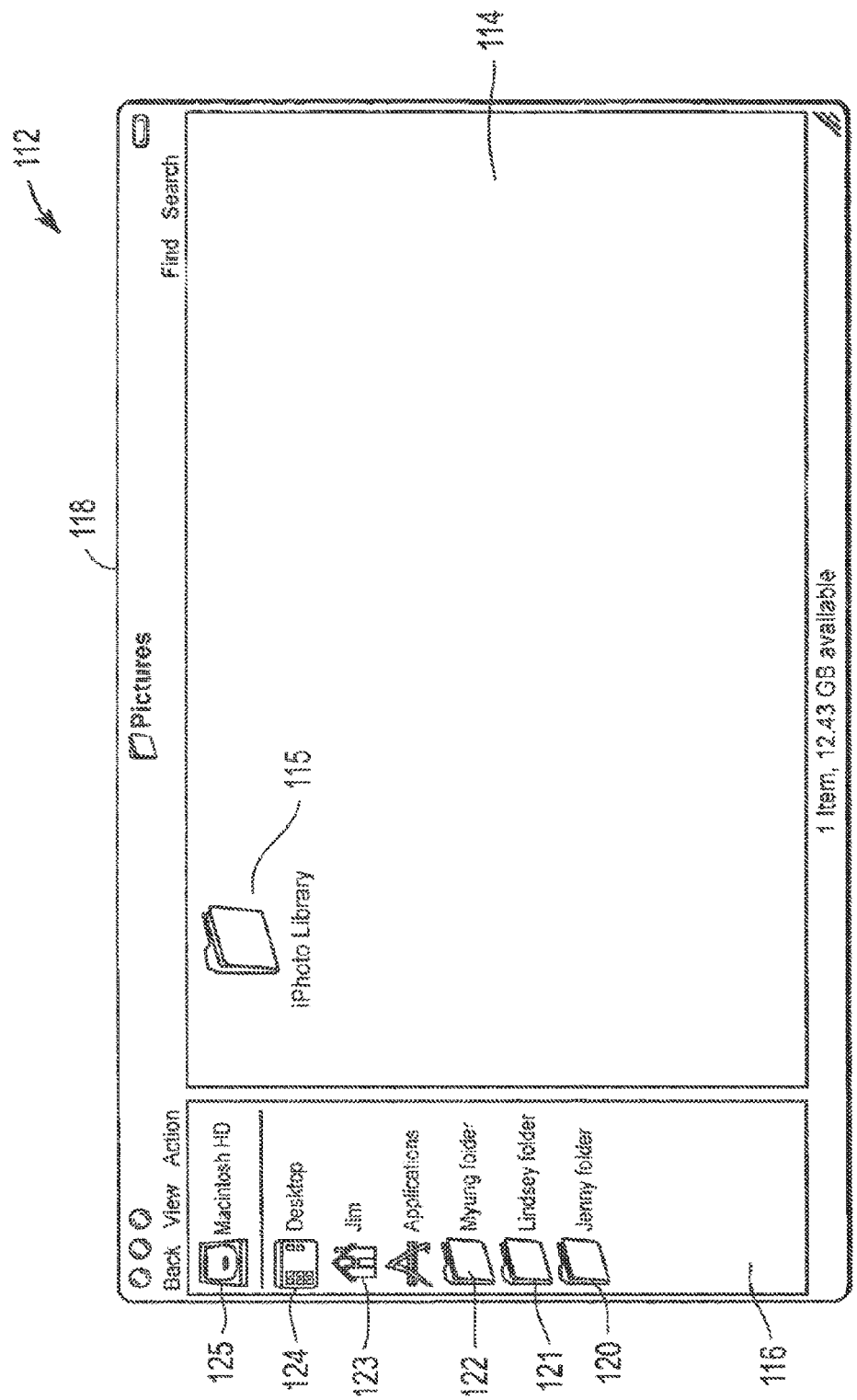

FIG. 1A shows a method for creating an object in a user configurable portion of a window and using that object in the portion. This particular method may be implemented in a window which is controlled by a file management system user interface such as the Finder program in a Macintosh operating system or other file management system user interfaces. The method of FIG. 1A may begin in operation 101 in which the data processing system receives an input from a user which indicates the placement of an object into a predetermined portion of a window. This predetermined portion may be a side bar of a window which is user configurable. This input may occur through a cursor control device, such as a mouse, which controls a cursor which is moveable on a display (although there are numerous alternative input systems including touch screens and speech recognition systems which may be used instead of a mouse). The user may select a file or folder by positioning the cursor over the file or folder and pressing down and holding down a button, such as a mouse's button, thereby causing the object, such as a file or folder, to be selected. The user may then, while maintaining the selection (by keeping the button down), "drag" the file or folder into the predetermined portion, such as a side bar of a window. The user typically deposits the object by releasing the mouse button or by otherwise providing a command to the system to unselect the object. It will be appreciated that there are numerous other ways to indicate this placement of an object into a user configurable portion of a window, such as a side bar. For example, the user may select the object and then select a command such as a "place into side bar" command or the user may select the object and then position the cursor in the portion (e.g. the side bar) and select a "paste" command to thereby deposit the object into the user configurable portion, such as a side bar. FIG. 1B shows an example of a window controlled by a file management system user interface of one embodiment of the invention. The window includes a side bar 116 which includes several objects which have been previously selected and dragged into the side bar 116 to create the objects, such as folders 120, 121, and 122 in the side bar 116. In the state of the window shown in FIG. 1B, a user could add the iPhoto folder 115 into the side bar 116 by selecting the folder 115 and dragging it into the side bar 116 or by other techniques described herein or by modifications to these techniques which are apparent to those in the art.

Figure 1C:
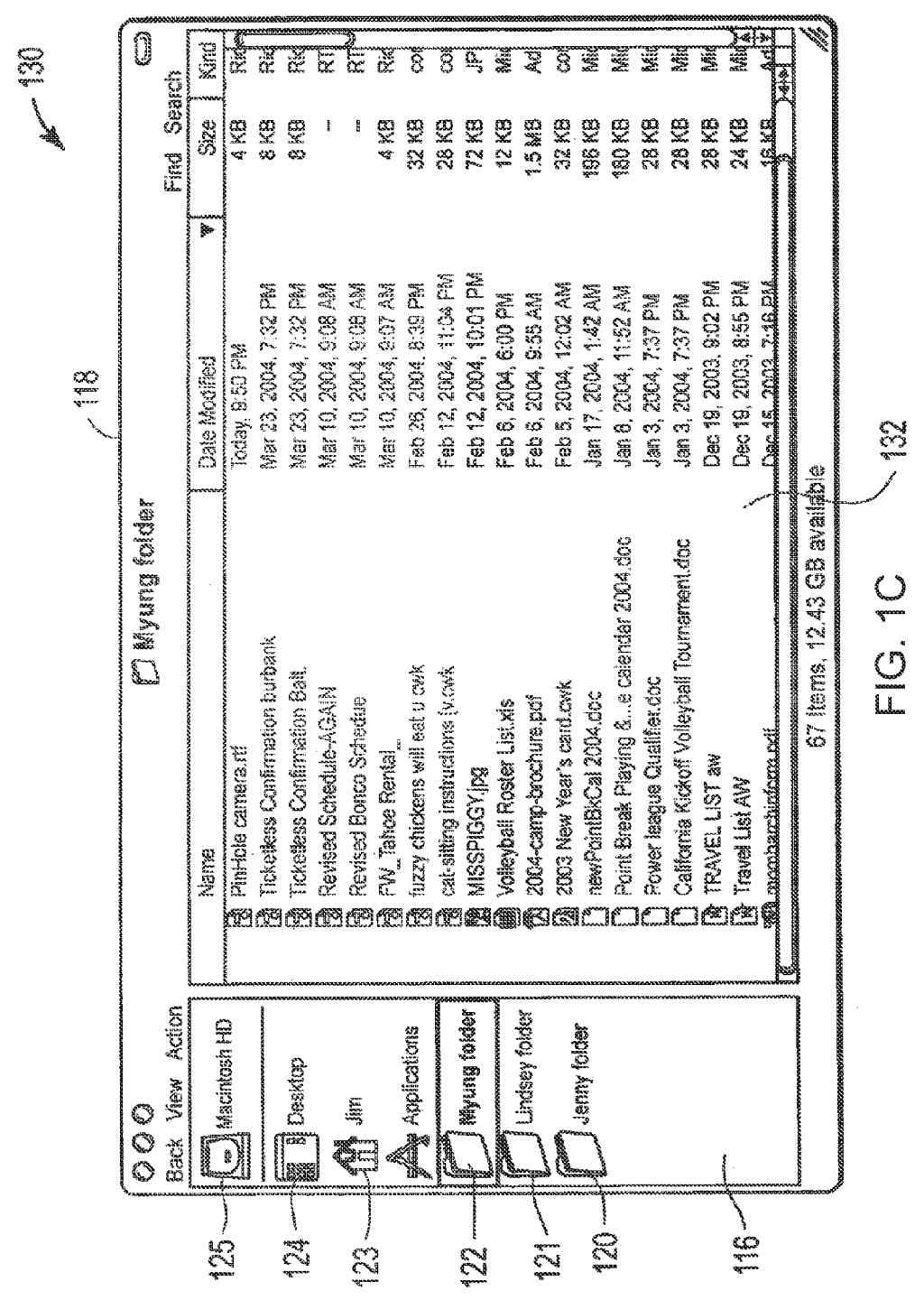
Figure 1D:
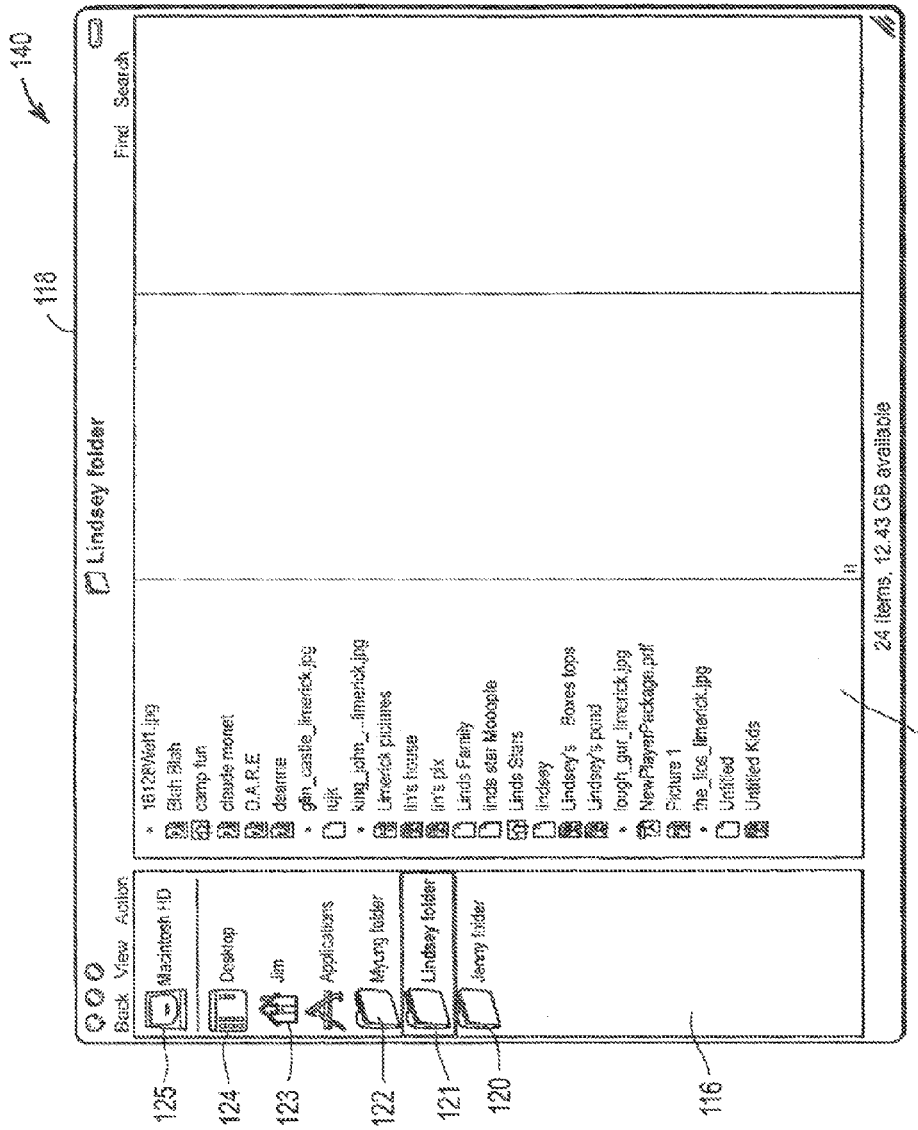

After the data processing system receives the input from operation 101, the data processing system then displays the object in operation 103 in the predetermined portion. The system may, for example, display the object in a scrollable area of a portion of a window controlled by a file management system user interface, such as the window 112 shown in FIG. 1B. After the one or more objects have been placed into the predetermined portion, which may be considered a user configurable portion, then the user may use the object by selecting it or performing other actions relative to the object. For example, in operation 105, the user may select the object in the predetermined portion and the system receives this input and uses a pointer to find the actual object so that it can be displayed within another portion of the window. This pointer may be a pointer to a file path name or a subdirectory. After receiving the user input in operation 105, the system displays a list or other representation of items represented by the object, such as a list of path names or subdirectories contained by the object. Examples of the display of such lists as in operation 107 are shown in FIGS. 1C and 1D. In particular, in FIG. 1C, the user has selected folder 122 which has caused the display of a list of files contained within the folder 122. Similarly, in FIG. 1D, the user has selected the folder 121 to thereby cause a display of the files contained within the folder 121 which is a subdirectory within the hierarchy of directories and subdirectories on the hard drive represented by object 125 shown in both FIGS. 1C and 1D.

Figure 9A:
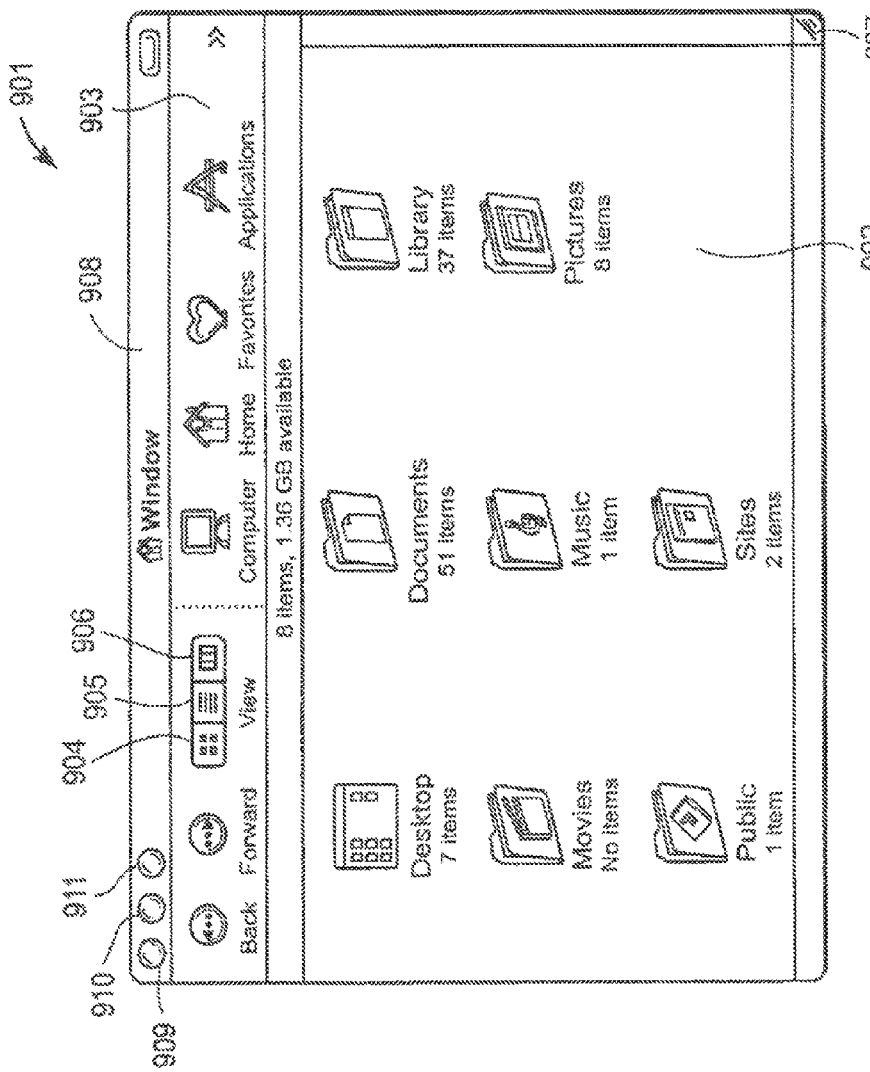
FIG. 9A is an example of a prior art window displayed by the file management user interface system of Macintosh OS X (10.2; Jaguar).
Figure 9B:
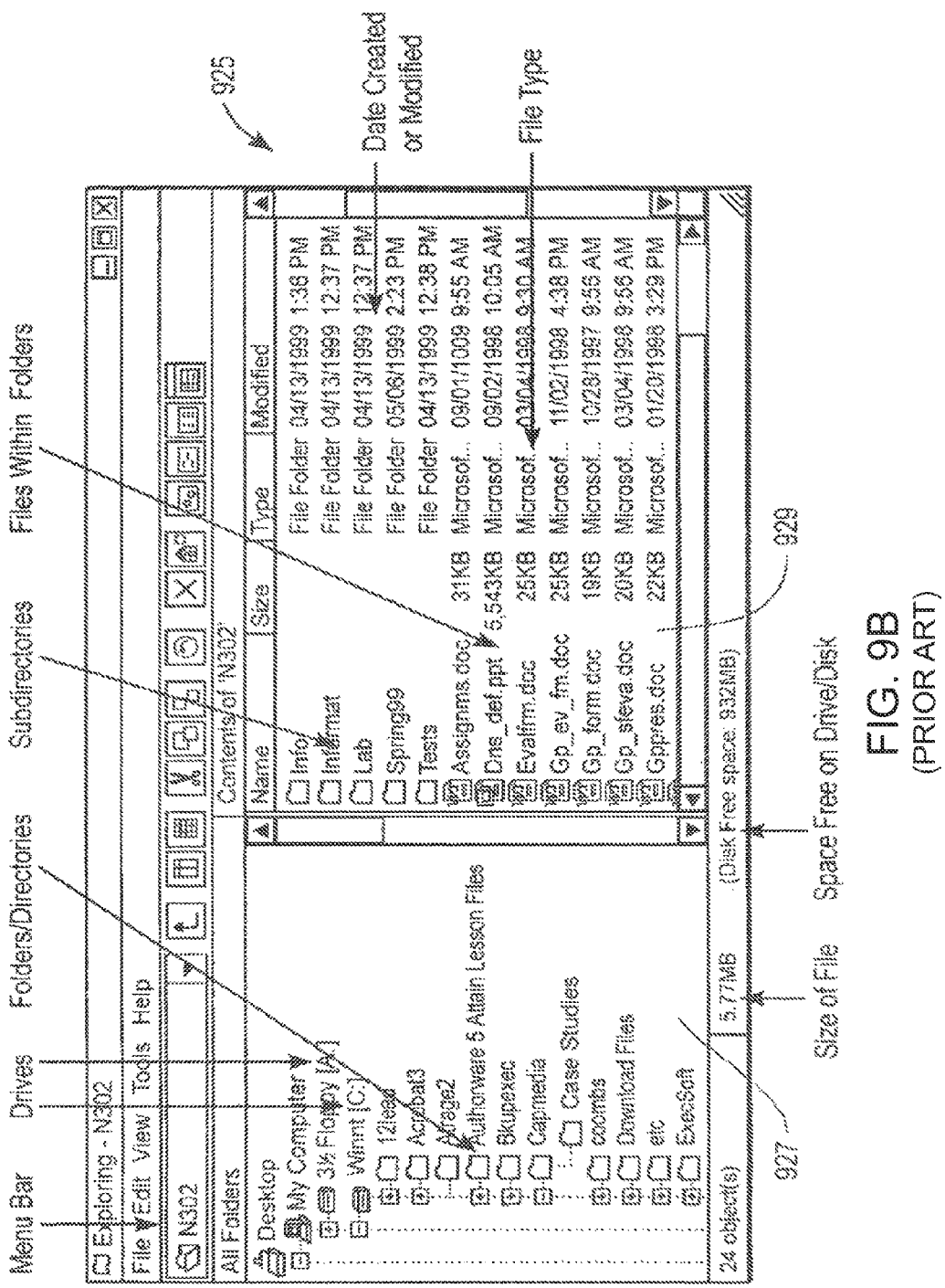
FIG. 9B is an example of a prior art file management system user interface, referred to as Windows Explorer for the Windows operating system.

Further description of the windows shown in FIGS. 1B, 1C and 1D will now be provided. The window 112 of FIG. 1B shows the content of a Pictures folder which contains the iPhoto Library folder 115. The list of items within the Pictures folder is shown in the region 114 of the window 112. The window 112 also includes a tool bar 118 which includes similar commands to the tool bar shown in FIG. 9A and also includes a close window button, a minimize button, and a maximize button as well as a menu selection for selecting the view shown in the region 114. The side bar 116 is a user configurable portion which in this case has been configured to show a Home folder 123 and a desktop 124 as well as an Applications folder and the folders 120, 121, and 122. In addition, the side bar includes the object 125 which represents a hard drive containing all the files and subdirectories on this particular system. FIG. 1C shows a window 130 which includes a region 132 which shows a listing of the files contained within the folder 122. The user may have, prior to the image shown in FIG. 1C, been viewing another folder and can then obtain a view of the contents of folder 122 by merely selecting the folder 122 in the side bar 116. The selection may occur by positioning the cursor over the folder 122 and pressing and releasing a button, such as a mouse's button. It will be appreciated that other techniques may be used to select the folder 122. The view shown within the region 122 may be referred to as a list view which may be obtained through the "view" control in the tool bar 118. The view shown within FIG. 1D is referred to as a "column" view which shows a view simultaneously in a hierarchical fashion through directories and subdirectories. The view shown in window 140 of FIG. 1D in this particular case shows that the folder or subdirectory 121 contains no other folders or subdirectories. In other words, each object in the listing shown in the column 142 is a file rather than a subdirectory containing files or other subdirectories. Note that when the column view is selected, the selection of a folder in the side bar causes the display of items in that folder ("selected folder") and any folders which are lower in the hierarchy, but folders and directories above the selected folder are not (in one embodiment) shown in the column view.

It will be appreciated that in alternative embodiments, the side bar may be located on different regions of a window, such as along the bottom of a window or along the top of a window or along the right side of a window.

Figure 2A:
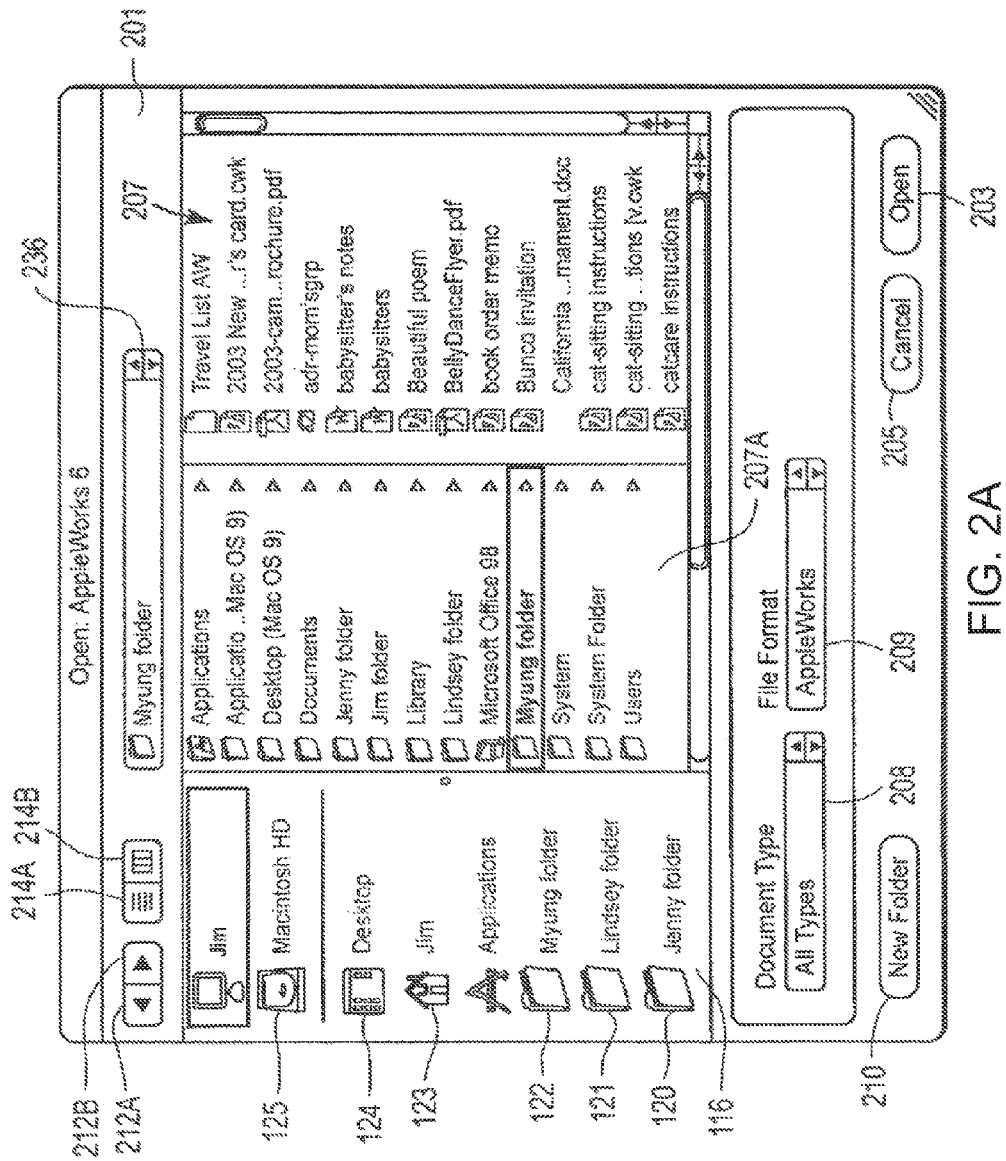
FIG. 2A shows an example of an open user interface window according to one embodiment of the invention.
Figure 2B:
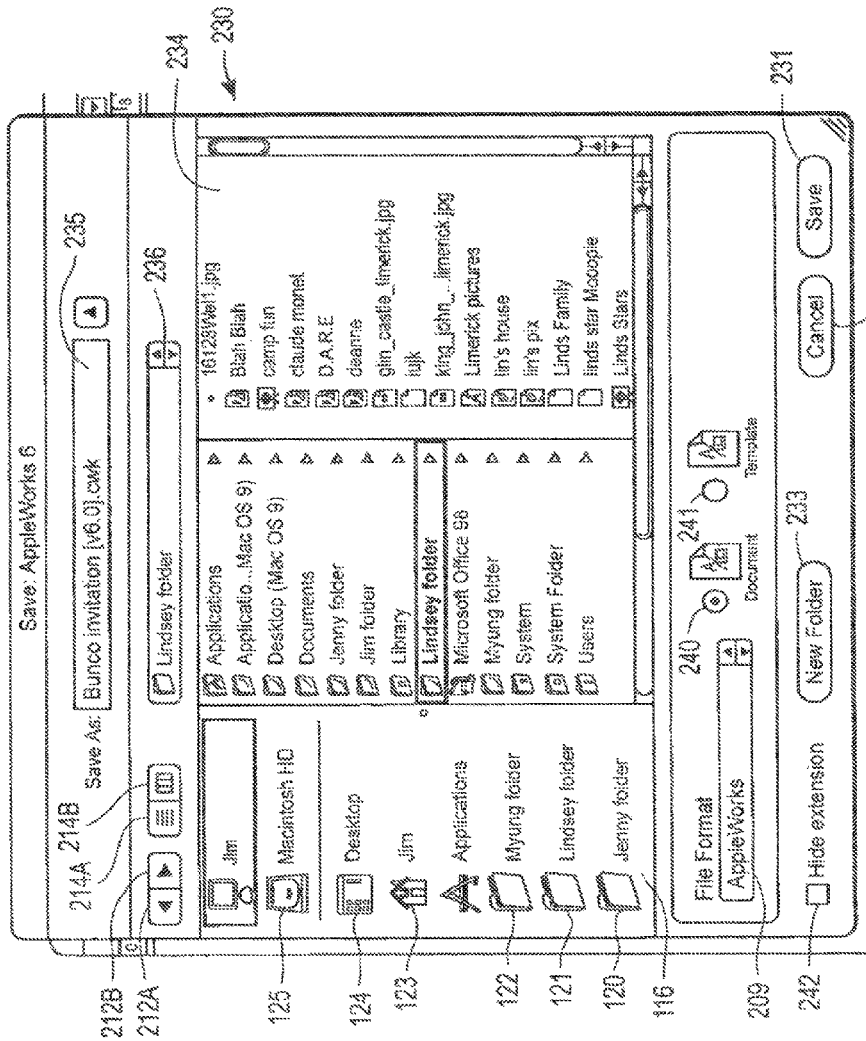
FIG. 2B shows an example of a save user interface window according to an embodiment of the present invention.
Figure 2C:
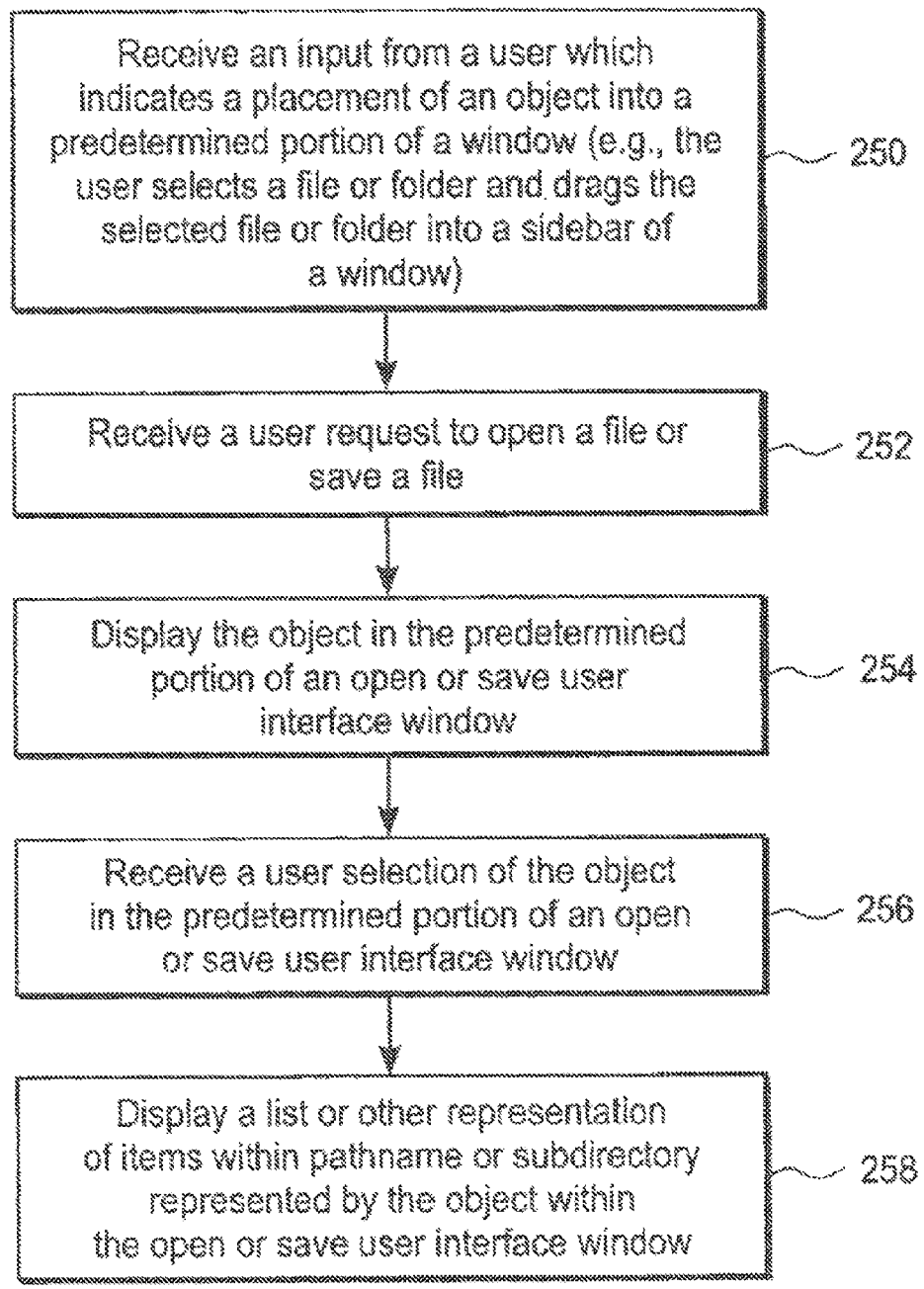
FIG. 2C shows a method for operating an open or save user interface window.

FIGS. 2A, 2B, and 2C show an embodiment in which a user configurable portion is implemented within one or both of an open or save user interface window. These user interface windows may be available system wide (to all application programs) or to at least a group of application programs which are executable upon a particular data processing system. FIG. 2A shows an example of an open user interface window, and FIG. 2B shows an example of a save user interface window, and FIG. 2C shows an example of a method for using one or both of these user interface windows. Typically, the window shown in FIG. 2A appears as a result of a user instructing the data processing system to open a file (e.g. using an "open" command to open a file in a word processing program or a spreadsheet program, etc.), and the window shown in FIG. 2B appears as a result of a user instructing the data processing system to save a file (e.g. save a copy of a file) or to "save as" a file (e.g. using a "save as" command to save a copy of the file with a different file name or file type or in a different location, etc.). The window 201 of FIG. 2A includes a side bar 116 which includes a plurality of objects including folders 120, 121, and 122 as well as the object 125 which represents a storage medium, in this case the main hard drive of a computer system, and a Home folder 123 and a desktop object 124. The open window 201 shows that the user has selected the folder 122 for the action of opening a particular file contained within that folder. The window 201 includes an open button 203 which may be selected in a conventional manner to open a file designated by the user. The cancel button 205 may be selected by the user in a conventional manner to cause the open user interface window 201 to disappear from the display without opening a file. Several other menus and controls are shown in window 201 including a document type menu selector 208 and a file format type selector 209 which allows a user to select only a portion of certain files matching the format to be displayed or to be selectable within the region 207. Other controls in the window 201 include a back button 211A and a forward button 212B which allow a user to move back or forward respectively in the same manner as back and forward buttons for a Web browser, such as Internet Explorer or Safari or Netscape's Navigator. The user can also select different types of views by using either the list view button 214A or the column view button 214B. In the example shown in FIG. 2A, the column view button has been selected by the user, resulting in the column view shown in window 201. The user may change the selection of folder 122 and go to a different folder by a conventional approach of selecting the hard drive icon which would then display a complete listing of folders and files at the highest directory level in the first column 207A and also display files and folders at the next level of hierarchy in the column 207. Rather than using this conventional approach, if the user wants to switch from the current subdirectory represented by folder 122 to the subdirectories represented by folders 120 or 121, the user may merely select either of these folders in the side bar 116 and the system will then display the contents of the selected folder within the open user interface window. The user may then select a particular file shown in the listing of column 207 and then select the open button 203 to cause the file to be opened within the particular application program, which in the case of FIG. 2A is the program AppleWorks.

FIG. 2B shows an example of a save user interface window which includes the side bar 116. This window 230 includes a save button 231 and a cancel button 232 and a new folder button 233 as well as several other graphical user interface controls. The save window 230 also includes a text entry field 235 which allows the user to enter, such as by typing, a name for the file to be saved. The side bar 116 of the window 230 allows a user to quickly select any of the particular subdirectories represented by the objects within the side bar, such as the folder 122. The contents of the folder 121 are currently shown within column 234 indicating that if the user selects the save button 231, then a file with a name given in text field 235 will be saved into the folder 121. If the user would rather save that file into a different folder, such as folder 122, the user can select the object 122 in the side bar 116 to thereby cause the display of the files within the folder 122 and then be able to save the file with the given name in the text field 235 within that different folder. The window 230 also includes a pull down menu 236 which provides an alternative mechanism for the user to change a directory or subdirectory which is currently selected for the save operation (or the open operation in the case of window 201).

FIG. 2C shows an exemplary method of using a save or open user interface window. In operation 250, the system receives an input from a user which indicates a placement of an object into a predetermined portion of a window. In one example of this method, this may occur by a user selecting a file or a folder and dragging the selected file or folder into a side bar of a window. The side bar 116 is an example of a side bar having a variety of objects including files or folders or application programs or a combination of these items. In operation 252, the system receives a user request to either open a file or save a file. This typically occurs in the context of a user using an application program such as a word processing program, a spreadsheet program, a drawing program, a Web browsing program, or numerous other types of application programs. In response to the request from operation 252, the system displays one or more objects in a predetermined portion of an open or save user interface window. Examples of these objects are folders 120, 121, and 122 shown in the side bar 116 which is an example of a predetermined portion or user configurable portion of a window, which in this case is an open or save user interface window. In operation 256, the system receives a user selection of the object in the predetermined portion of the open or save user interface window. This causes in operation 258 the display of a list or other representation of items within the path name or subdirectory represented by the object within the open or save user interface window. In the case of the save user interface window 230, the selection of folder 122 from the state shown in FIG. 2B will result in the listing of files and folders contained within the folder 122. Similarly, in the case of the open user interface window 201, which as shown in FIG. 2A, shows the contents of the folder 122, the selection of folder 121 from the side bar 116 will cause a listing of the objects contained within folder 121.

Figure 3A:
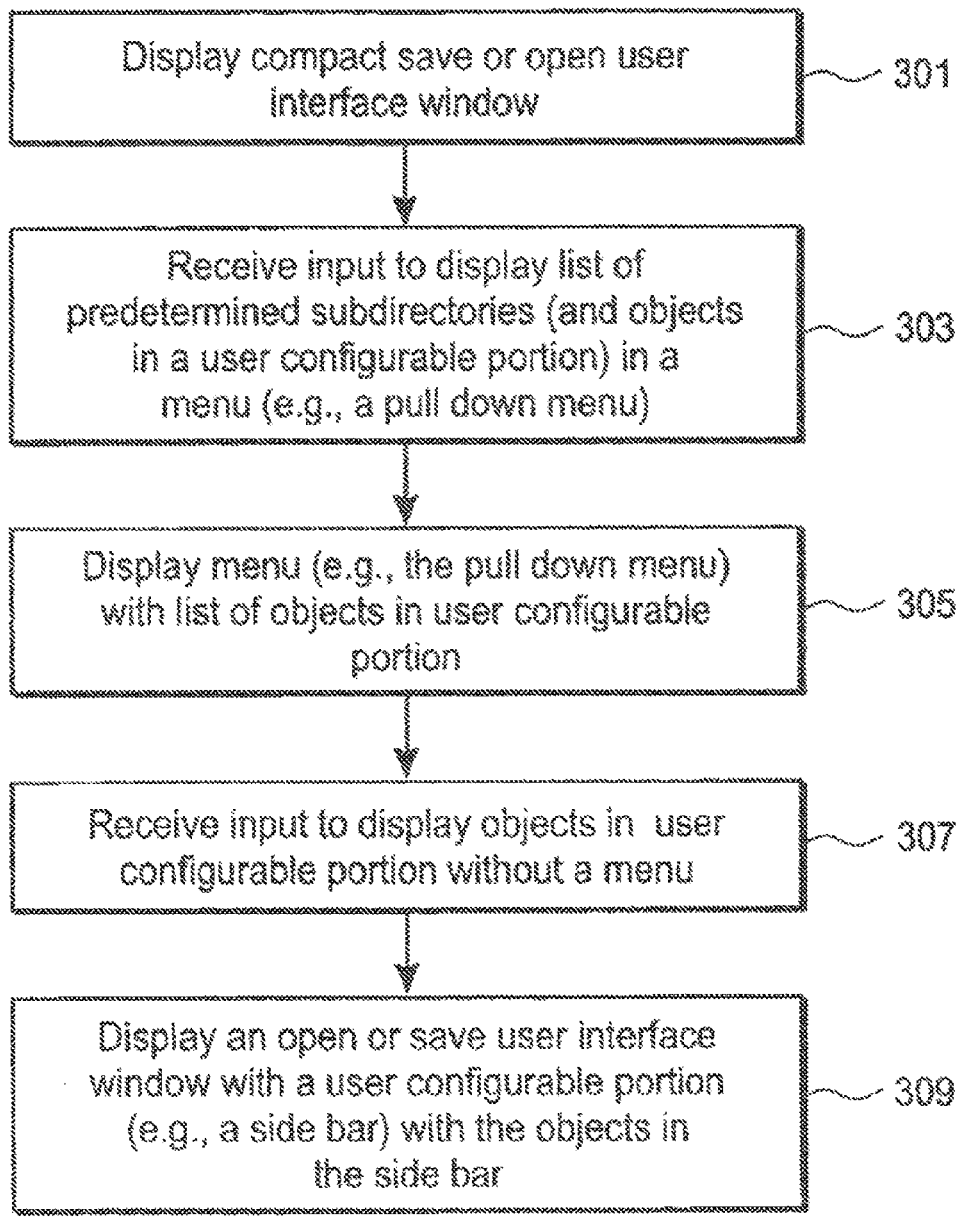
FIG. 3A shows a method, in an alternative embodiment, of operating a save or user interface window.
Figure 3B:
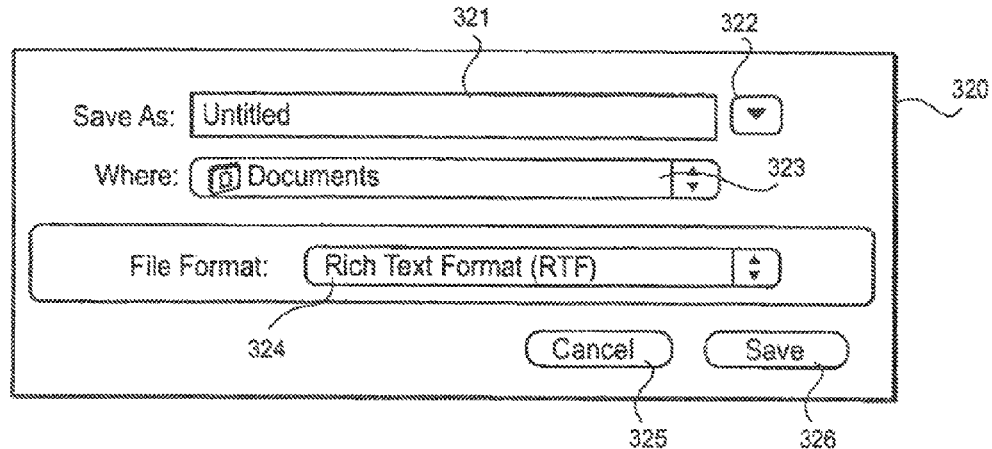
FIGS. 3B, 3C and 3D show an example of the windows referred to in FIG. 3A.
Figure 3C:
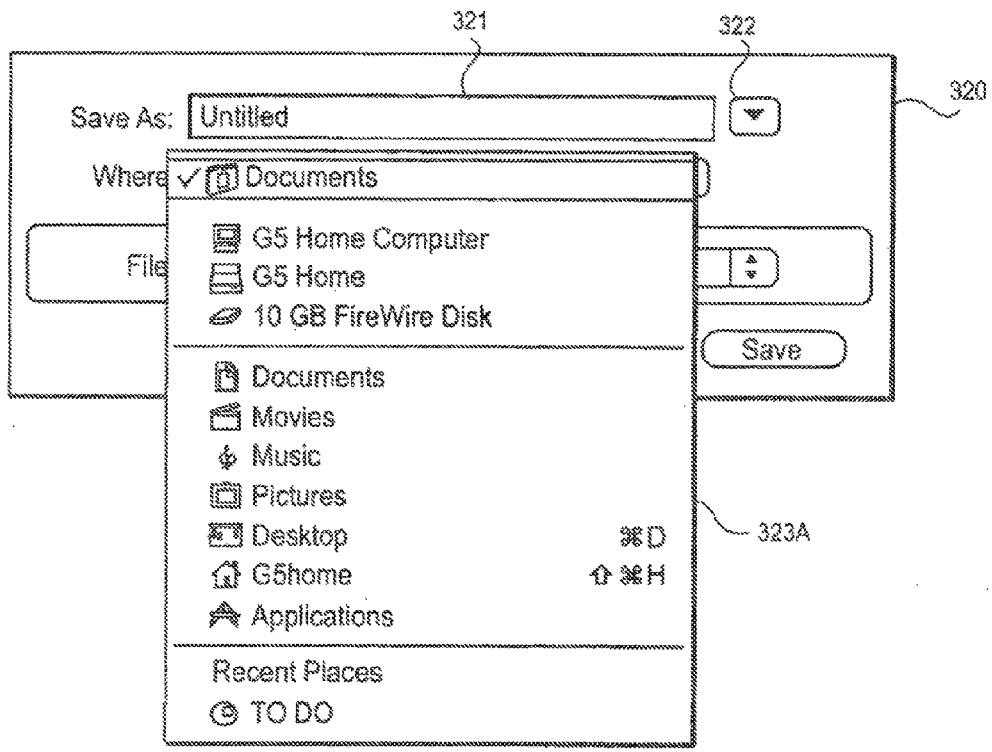
Figure 3D:
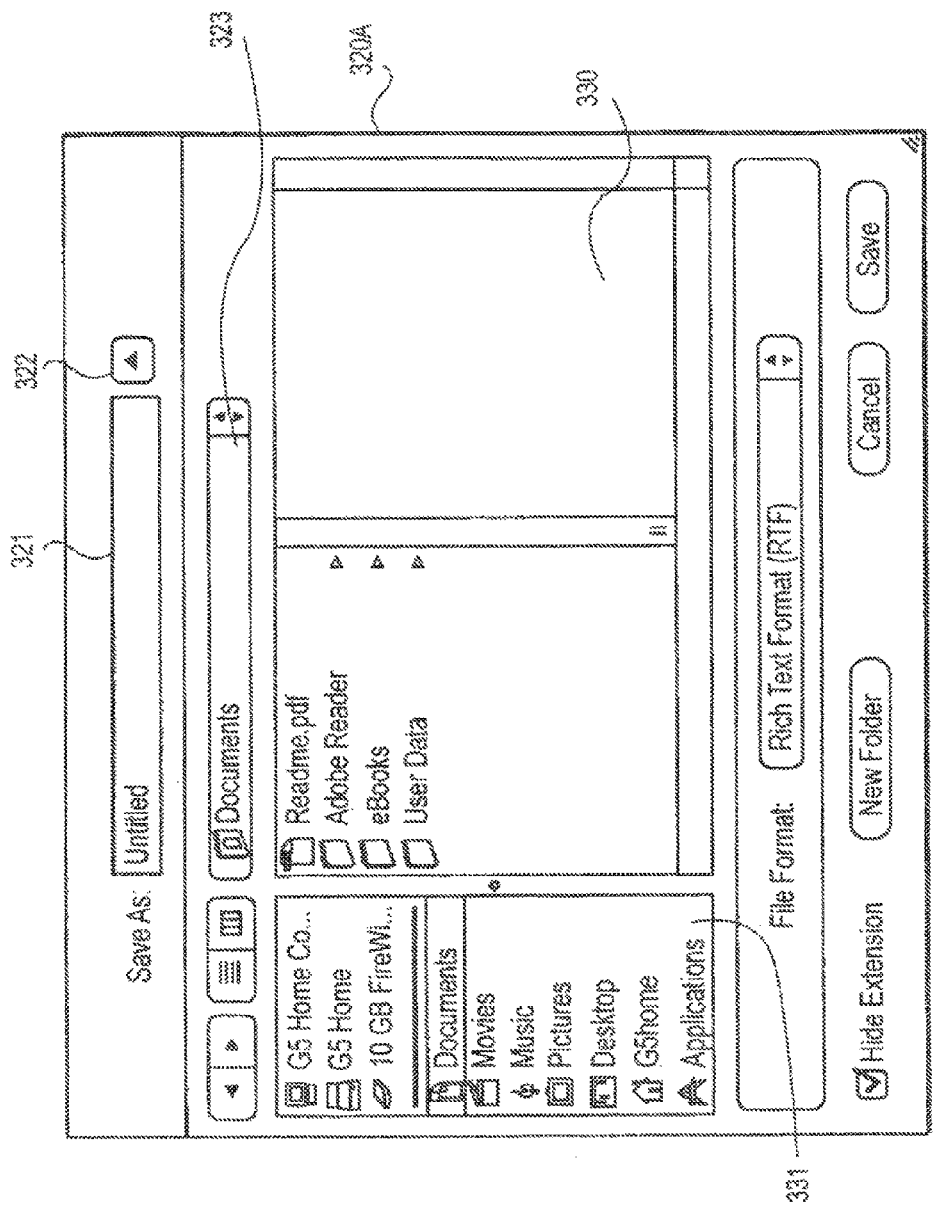

FIG. 3A shows an alternative implementation of an open or save user interface window which may be switched between modes by the use of a graphical user interface button, such as the button 322. The method of FIG. 3A may begin in operation 301 in which a compact save or open user interface window is displayed. An example of such a compact save or user interface window is the compact save window 320 which contains an expand/contract button 322 and a text entry field 321 and a pull down menu 323 and a file format pull down selector menu 324 and a save button 326 and a cancel button 325. The text entry field 321 allows the user to type in or otherwise enter a name for the file to be saved. The pull down menu 323 allows the user to select a particular location for saving the file. In the example shown in FIG. 3B, the location selected is the documents folder. If the user is satisfied with the name in the text entry field 321 and the location where the document will be saved, the user may select the button 326 in a conventional manner (e.g. click on the button by placing the cursor over the button on the display and pressing and releasing a mouse's button or other physical button). If the user wants to abort the save operation and cause the save window 320 to disappear, the user may select the button 325. Referring back to FIG. 3A, the system may, in operation 303, receive an input to display a list of predetermined subdirectories in objects from a user configurable portion in a menu such as a pull down menu. This results in the display of the menu in operation 305, wherein the menu includes a list of objects in a user configurable portion such as a side bar described herein. An example of a resulting display is shown in FIG. 3C in which a pull down menu 323A is shown and allows a user to select a particular location or to select from an object in a user configurable portion as described herein. The pull down menu 323A allows a user to move up and down through a hierarchy of directories and subdirectories and also allows a user to select directories and subdirectories which have been designated by placement in a user configurable portion. While some users are comfortable using the pull down menu such as the menu 323A, a user may decide to change from the compact save window 320 to an expanded save window shown in FIG. 3D by selecting the expand/contract button 322 from window 320. This is shown as operation 307 in which the system receives an input to display objects in the user configurable portion without a pull down menu, such as the pull down menu 323A. The system responds in operation 309 by displaying the open or save user interface window with the user configurable portion, such as the side bar 331 shown in FIG. 3D. This side bar 331 operates in a similar manner to the side bar 116 described herein. The user may return to the compact window 320 by again clicking or selecting the expand/contract button 322, resulting in a display of the window 320.

In certain embodiments of the invention, a user configurable portion may be present in both the open user interface window and the save user interface window as well as in windows controlled by the file management system user interface. In addition to these windows, the user configurable portion may also be present in print user interface windows. Alternatively, this user configurable portion may be in a subset of these windows rather than all of these windows. It will also be appreciated that additional user aids, such as a side bar tool editing window, may be provided to the user to allow the user to select various different commands which control the side bar, such as a command to restore the default configuration of the side bar or allow the user to select or deselect certain predetermined system objects, such as a main directory of a hard drive or other types of objects for inclusion in the side bar or exclusion from the side bar depending on the user's preference. Furthermore, in alternative embodiments, rather than having a separate save user interface window or an open user interface window which includes a side bar, a sheet which includes the side bars may be used as an open user interface or a save user interface. A sheet is an interface area which is attached to and inseparable from a particular document which is selected to be saved (or opened).

Figure 4:
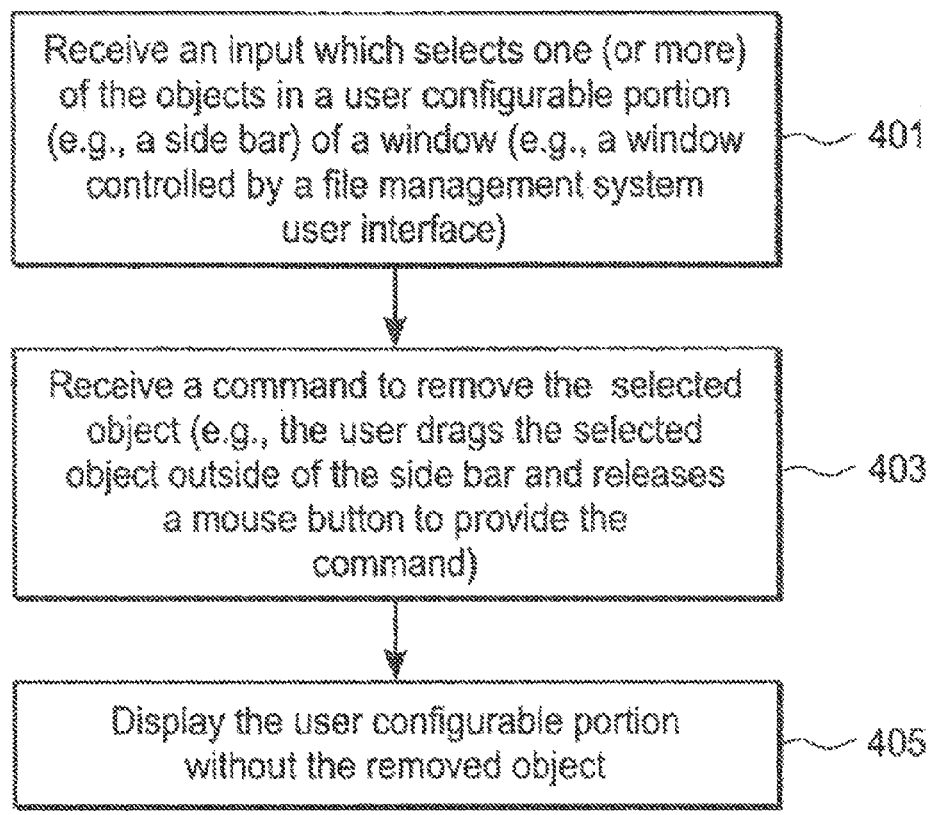
FIG. 4 shows a method of removing objects from a user configurable portion according to one embodiment of the invention.

While various methods have been described for adding objects into a side bar, it is also possible in certain embodiments to remove objects from a side bar. FIG. 4 shows an example of a method of this removal. This method may begin in operation 401 in which the system receives an input which selects one or more of the objects in a user configurable portion, which may be a side bar of a window. The selection may occur through a number of conventional ways, including through the positioning of a cursor over a particular object and the pressing and releasing of a button, such as a mouse's button, or the use of a touch screen or a voice command to select one or more objects. In operation 403, the system receives a command to remove the selected object. In one embodiment, this may involve the user dragging the selected object outside of the side bar and releasing a button, such as mouse's button, to provide the command. It will be appreciated that a drag operation may be performed by positioning a cursor over the object and pressing a button, such as a mouse's button and holding the button down while the user moves the cursor and the object together in what is referred to as a drag operation outside of the window, and once the user has moved the object and the cursor outside of the window, the object may be removed by releasing the button which had been depressed to maintain the selection during the dragging operation. In response to the command to remove, the system in operation 405 displays the user configurable portion without the removed object. In this manner, the user may remove objects which are no longer desired to be in the user configurable portion. It will be appreciated that other ways to remove such objects may be employed, such as selecting the object and then selecting a "remove" or "delete" command.

Figure 5A:
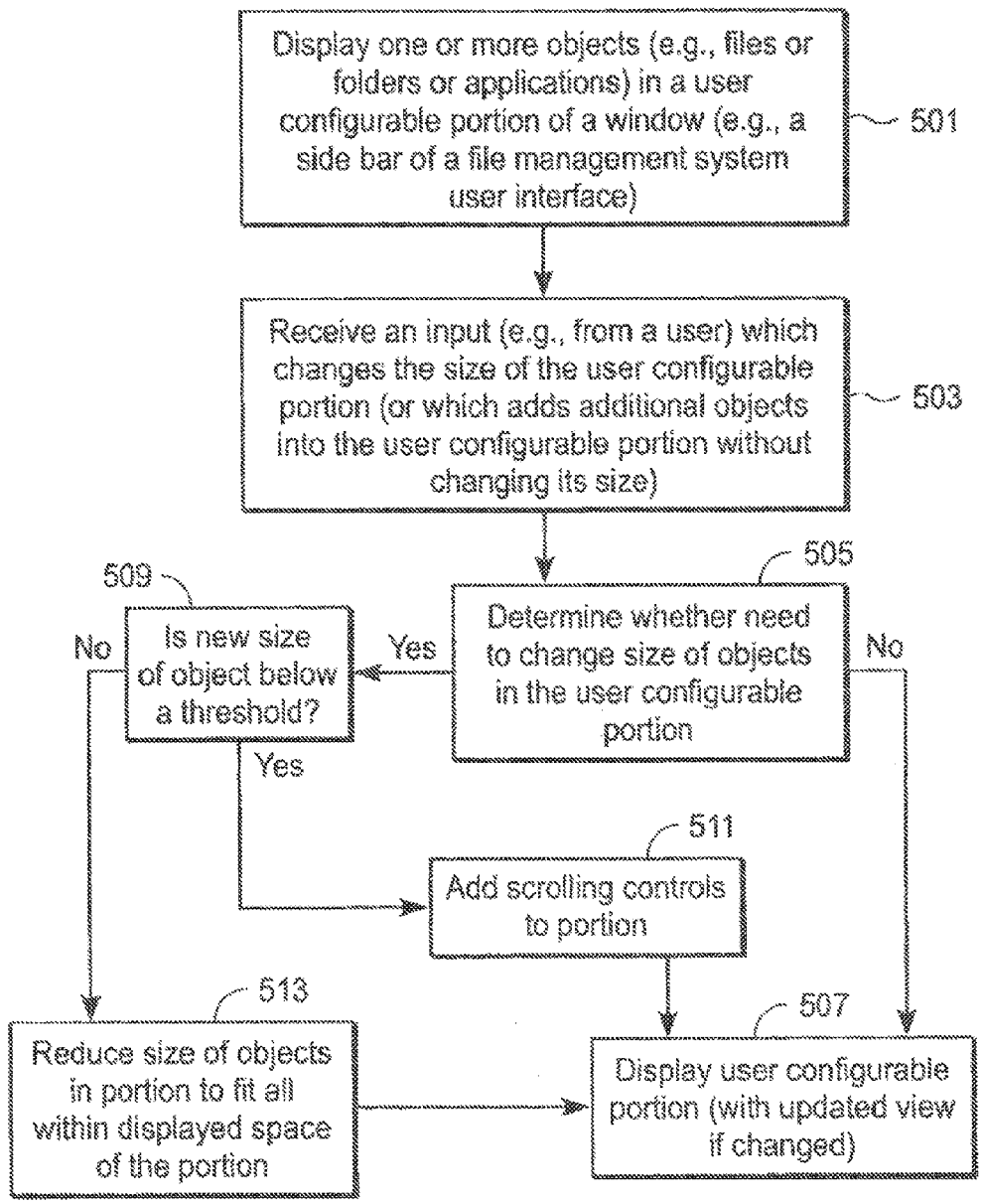
FIG. 5A shows a method of one exemplary embodiment for changing the size of the objects within the user configurable portion and/or providing a scrollable portion.
Figure 5B:
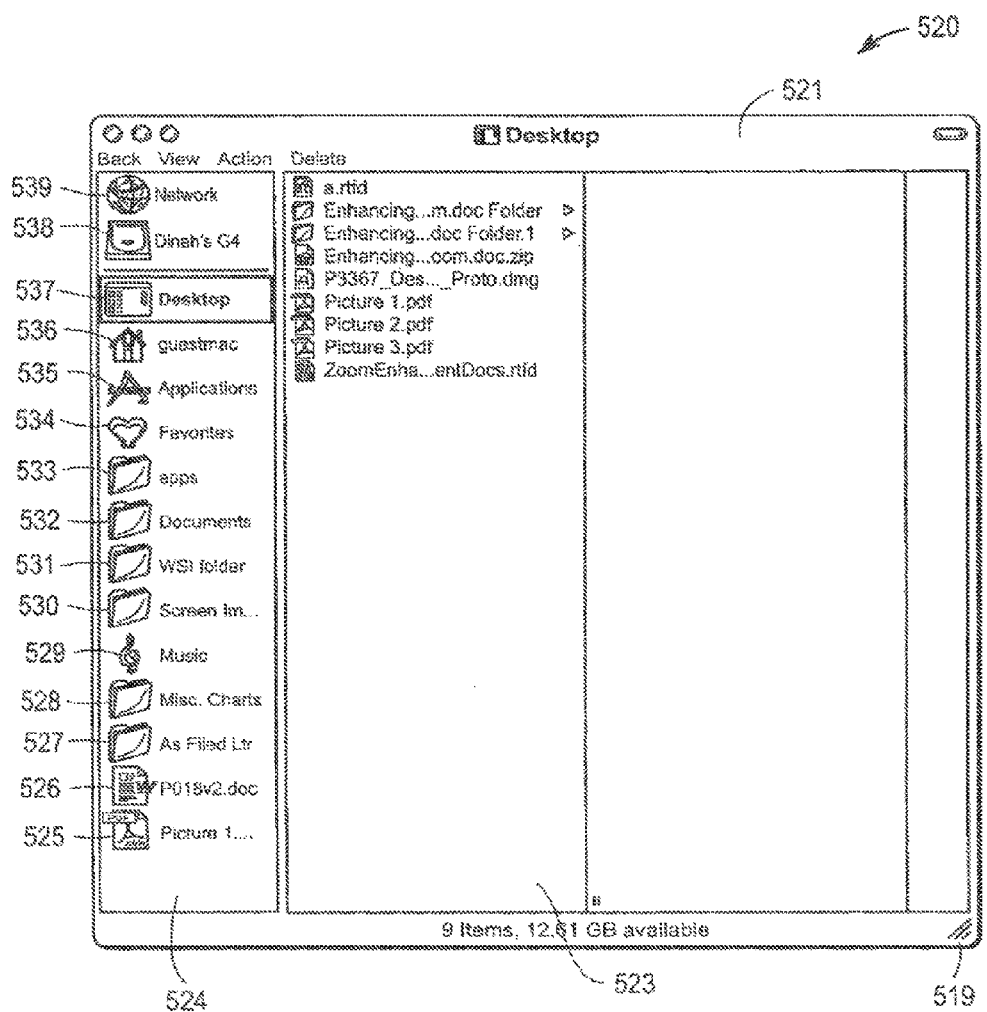
FIGS. 5B, 5C and 5D show examples of windows referred to in FIG. 5A.
Figure 5C:
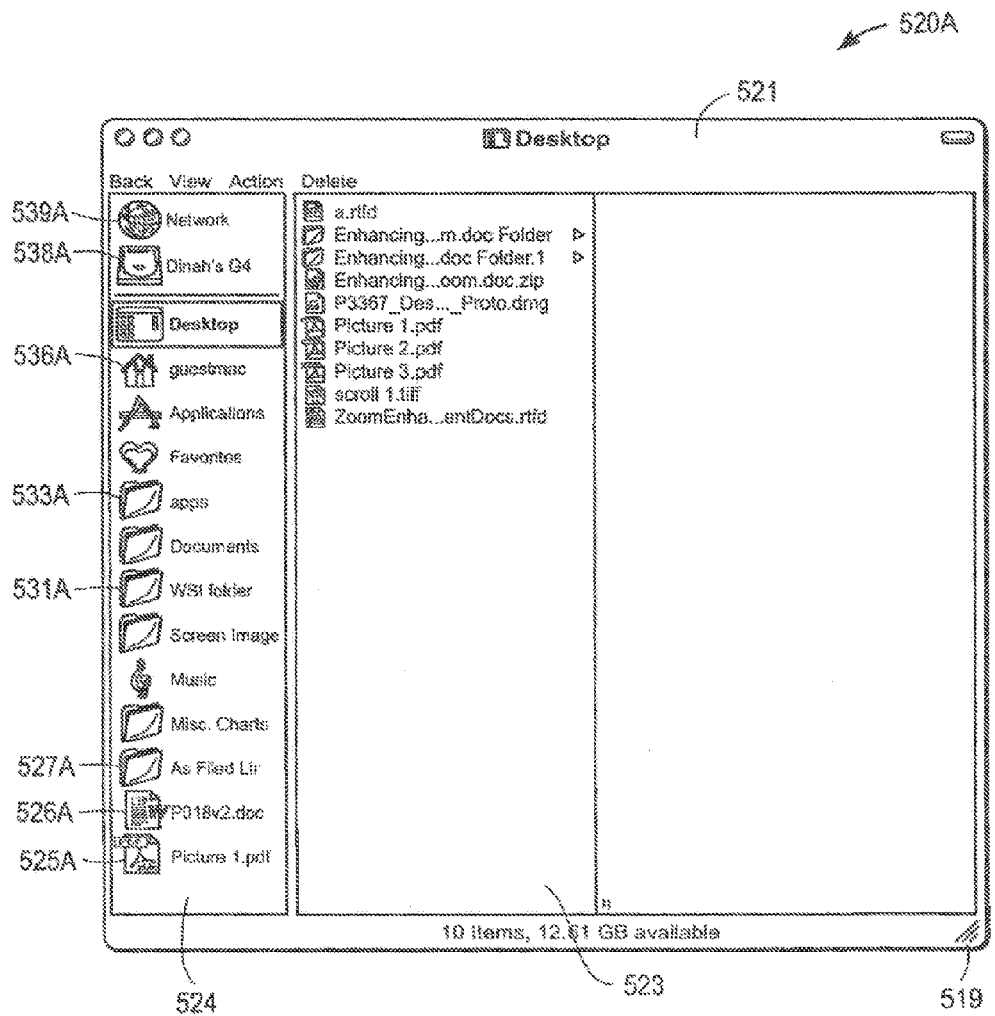
Figure 5D:
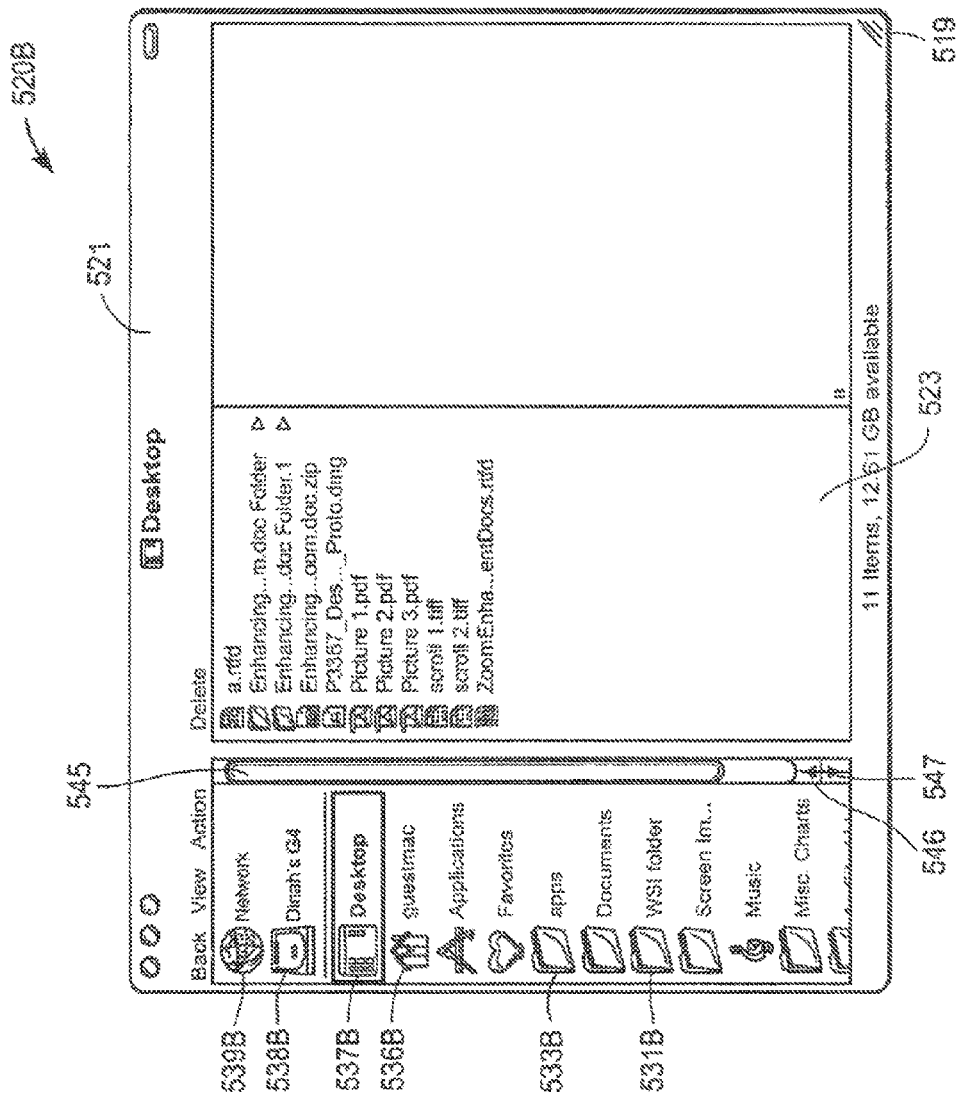

At least in certain embodiments, the user configurable portion may contain a large number of objects. In order to accommodate such a large number, these embodiments provide for the ability to change the size of each object within the user configurable portion as well as to provide scrolling controls. It will be appreciated that, rather than providing both of these abilities, a system may provide one or the other but not both. The particular embodiment described in FIG. 5A assumes that both features are provided rather than just one, such as the scrolling controls. In the method of FIG. 5A, operation 501 displays one or more objects, such as files or folders or application programs, in a user configurable portion of a window, such as side bar of a file management system user interface window. It is assumed at this point that there is sufficient space within the user configurable portion to display all of the objects within the portion. If this is not the case, then the system will jump to operation 505. In operation 503, the system receives an input, such as an input from a user, which changes the size of the user configurable portion or which adds additional objects into the user configurable portion without changing its size. This may result in the placement of too many objects within the user configurable portion such that not all objects can be displayed within the portion at their current size. The system then in operation 505 determines whether there is a need to change the size of the objects in the user configurable portion. If there is sufficient space to display all of the currently placed objects within the user configurable portion, then the system decides there is no need to change the size and moves from operation 505 to operation 507 in which it displays the user configurable portion with an updated view, if the view has changed (such as the addition of an object into the portion). If in operation 505 it is determined that there is a need to change the size of the object or objects, then in operation 505 the system determines whether the new size of the objects is below a threshold. If it is not, then processing proceeds to operation 513 in which the size of the objects is reduced to fit all the objects within the displayed space of the portion and then operation 507 follows. If, however, in operation 509 it is determined that the size of the objects is below a threshold size, then processing proceeds to operation 511 in which scrolling controls are added to the portion. It will be appreciated that these actions may be reversed when objects are removed from the user configurable portion or when the user configurable portion is enlarged to the point that scrolling is no longer required or the objects can be returned to their default size, which in one embodiment is their largest possible default icon size. FIGS. 5B, 5C, and 5D show the progression of a side bar as the size of the side bar is reduced as a result of reducing the size of a particular window. As is known in the art, a window may be resized by controlling the window size control 519 (e.g. the window size control 519 may be dragged to dynamically change the size of the window as the control is dragged). The window 520, in addition to the size control 519, also includes a tool bar 521 and a column display 523 of files and folders within the desktop subdirectory represented by the object 537 in the side bar 524. The side bar 524 also includes folders (subdirectories) and files which have been placed within the side bar 524 by using any one of the techniques described above. For example, the side bar 524 includes files 525 and 526 which may have been placed into the side bar 524 by selecting the file from the desktop or another folder or window and by dragging these files into the side bar 524. Similarly, the side bar 524 includes folders 527-533 as well as a Home folder or subdirectory 536, a folder for Applications 535 and a subdirectory 534 for Favorites. The view shown in FIG. 5B shows the default size of the objects within the side bar 524 before the window 520 has been reduced in size. The window 520A, shown in FIG. 5C, is the result of reducing the window 520 in size. This results in the reduction of the size of the icons in the side bar 524. However, all of the objects within the side bar 524 are still completely viewable and thus scroll controls are not necessary. As the window is reduced further in size, it becomes necessary to add scrolling controls, such as scrolling controls 545, 546, and 547 as shown in FIG. 5D. In FIG. 5D, it can be seen that the window 520B results from a reduction in size of the window 520A. A user can still access all of the objects within the side bar 524 by using the up scroll control 546 or the down scroll control 547 or by selecting and dragging the scrolling object 545. Alternatively, some input devices, such as mice or keyboards with scrolling wheels, may be used to scroll within the user configurable portion 524.

Figure 6A:
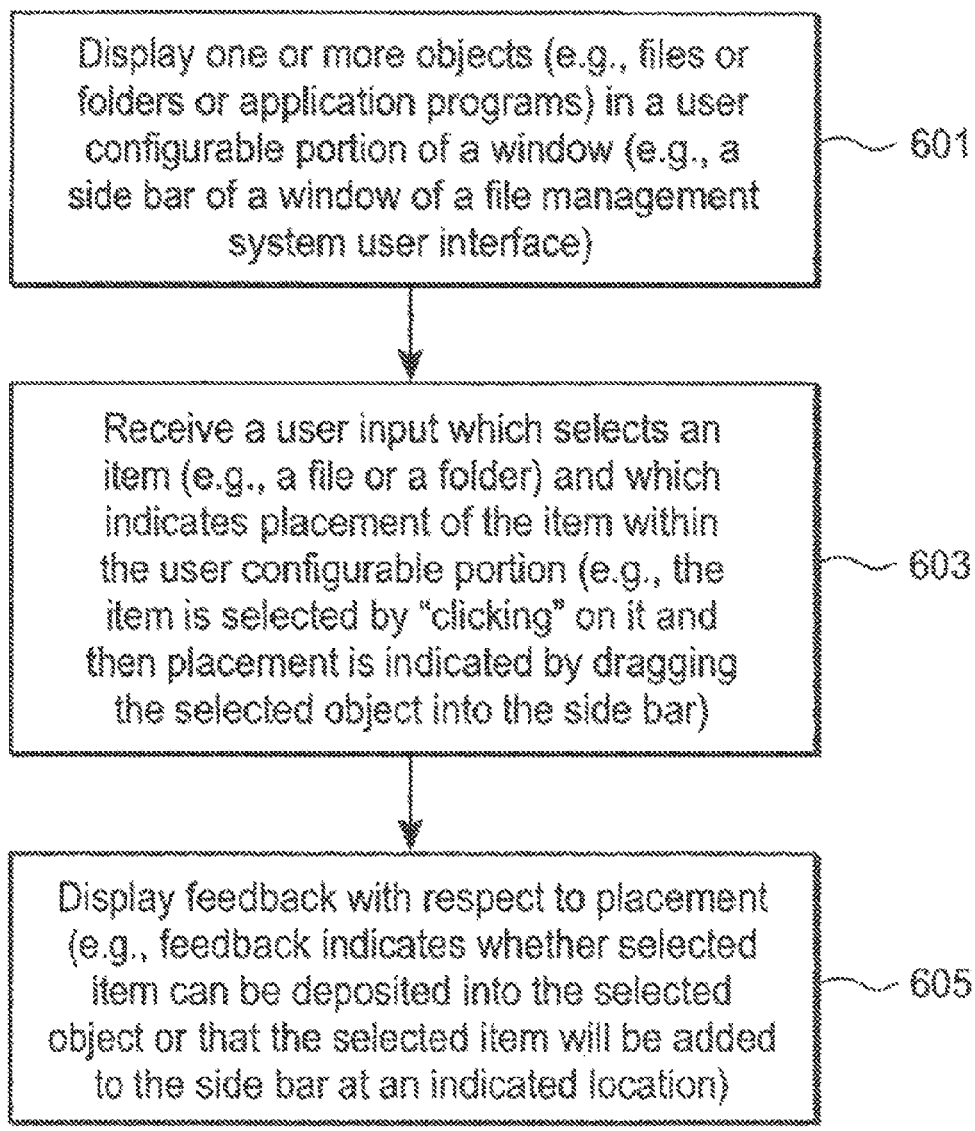
FIG. 6A shows an example of a method for providing feedback in connection with the use of objects in the user configurable portion.
Figure 6B:
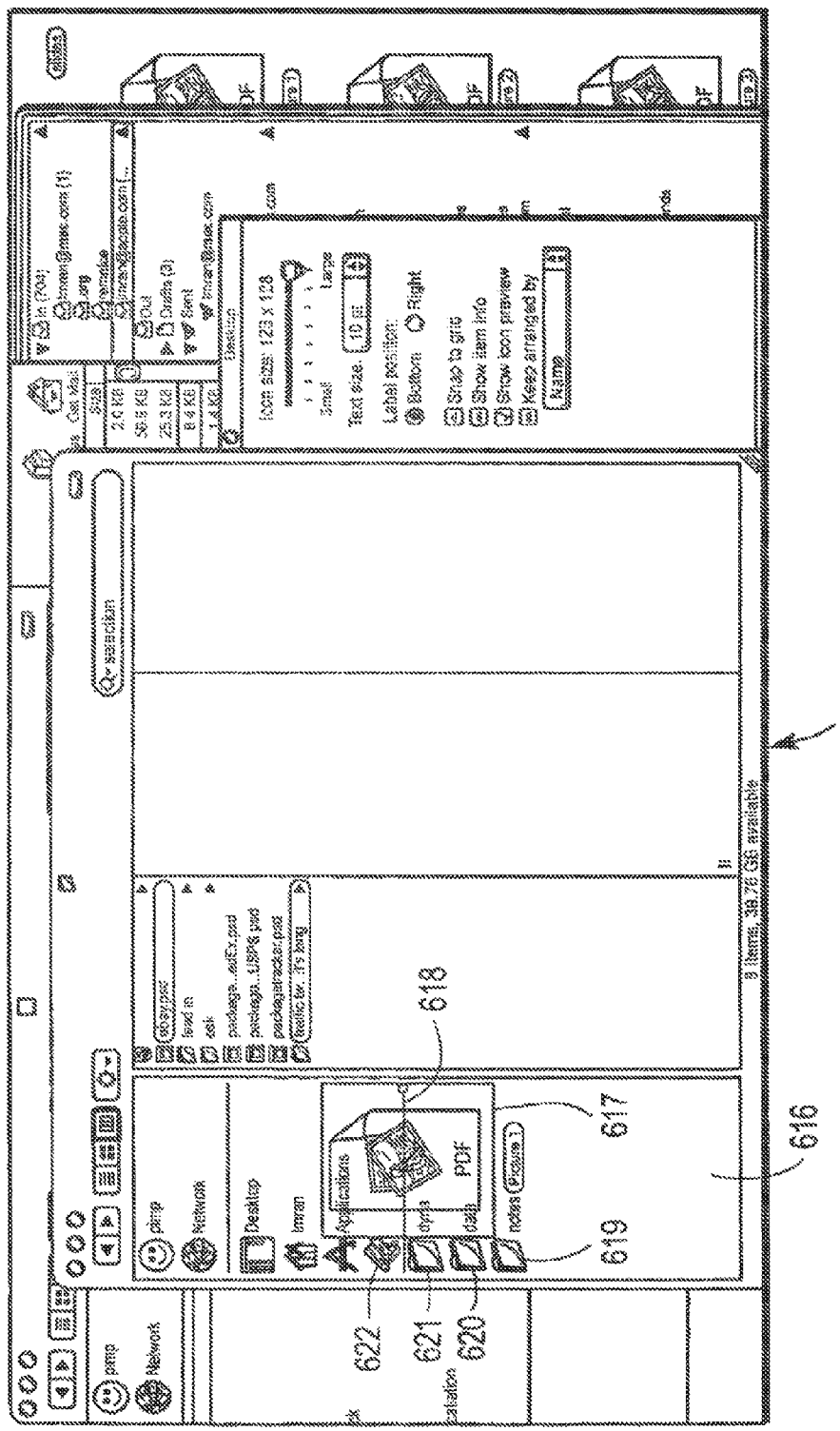
FIGS. 6B, 6C, 6D, and 6E show examples of windows which provide feedback in connection with the use of objects within the user configurable portion.
Figure 6C:
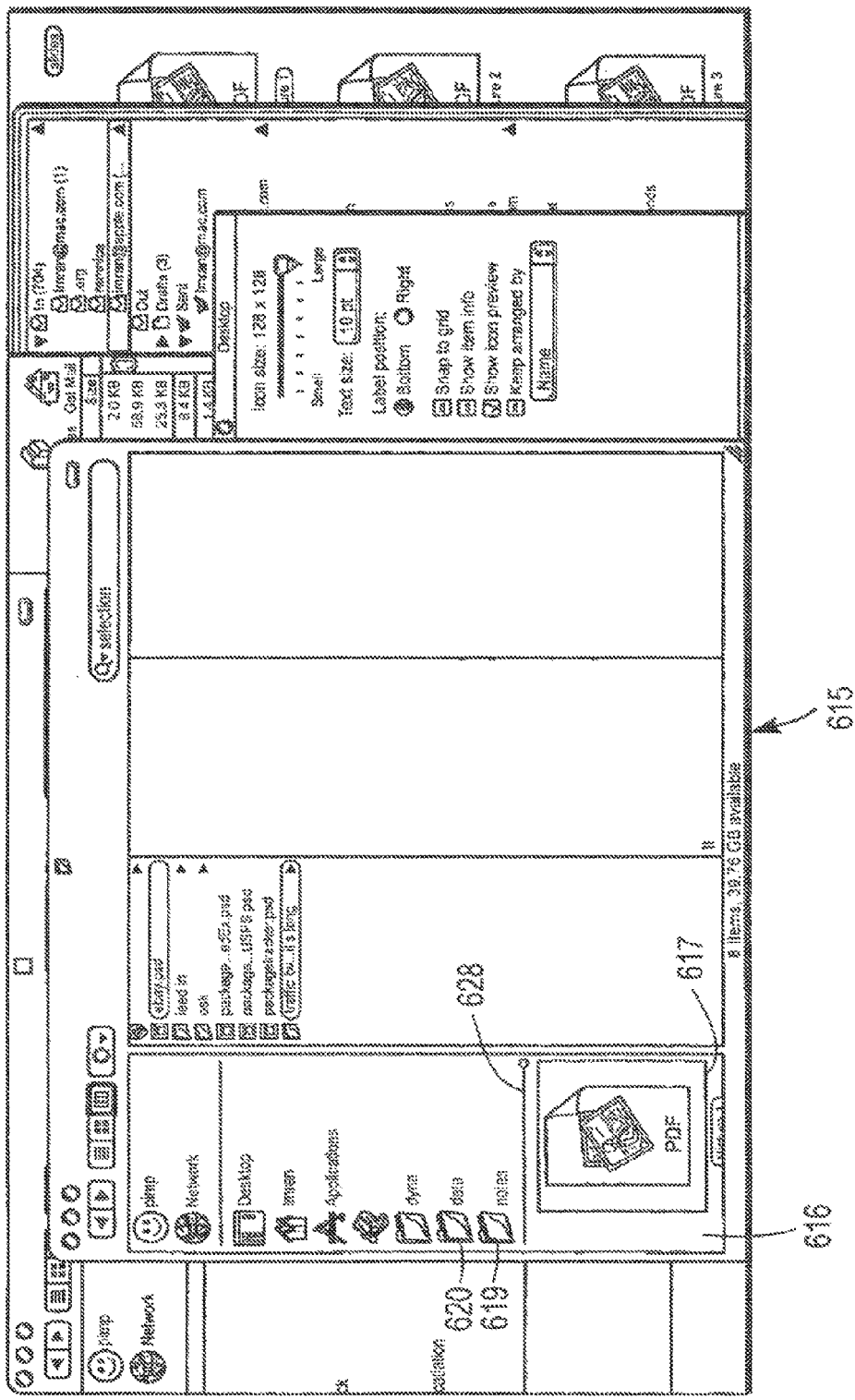
Figure 6D:
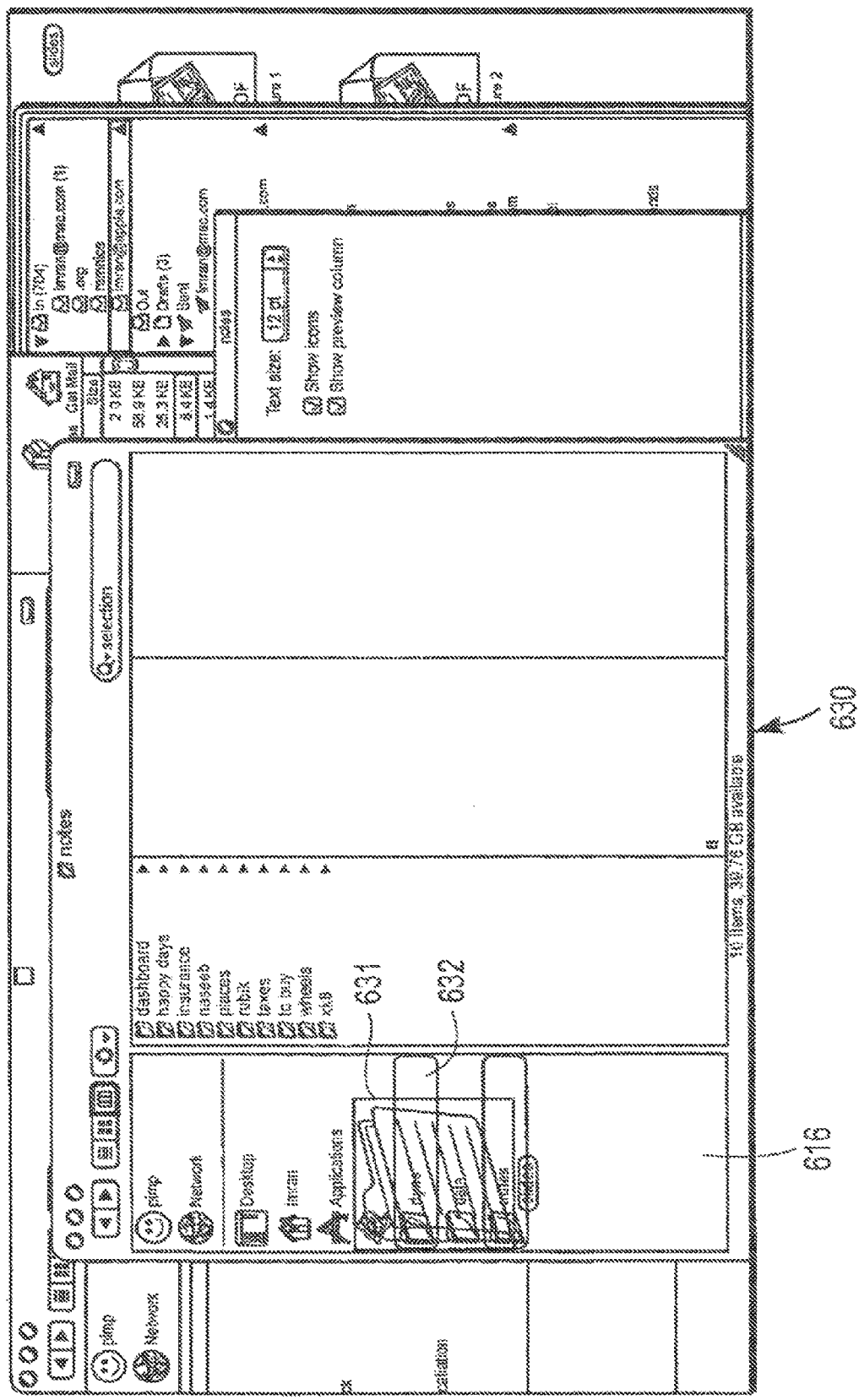
Figure 6E:
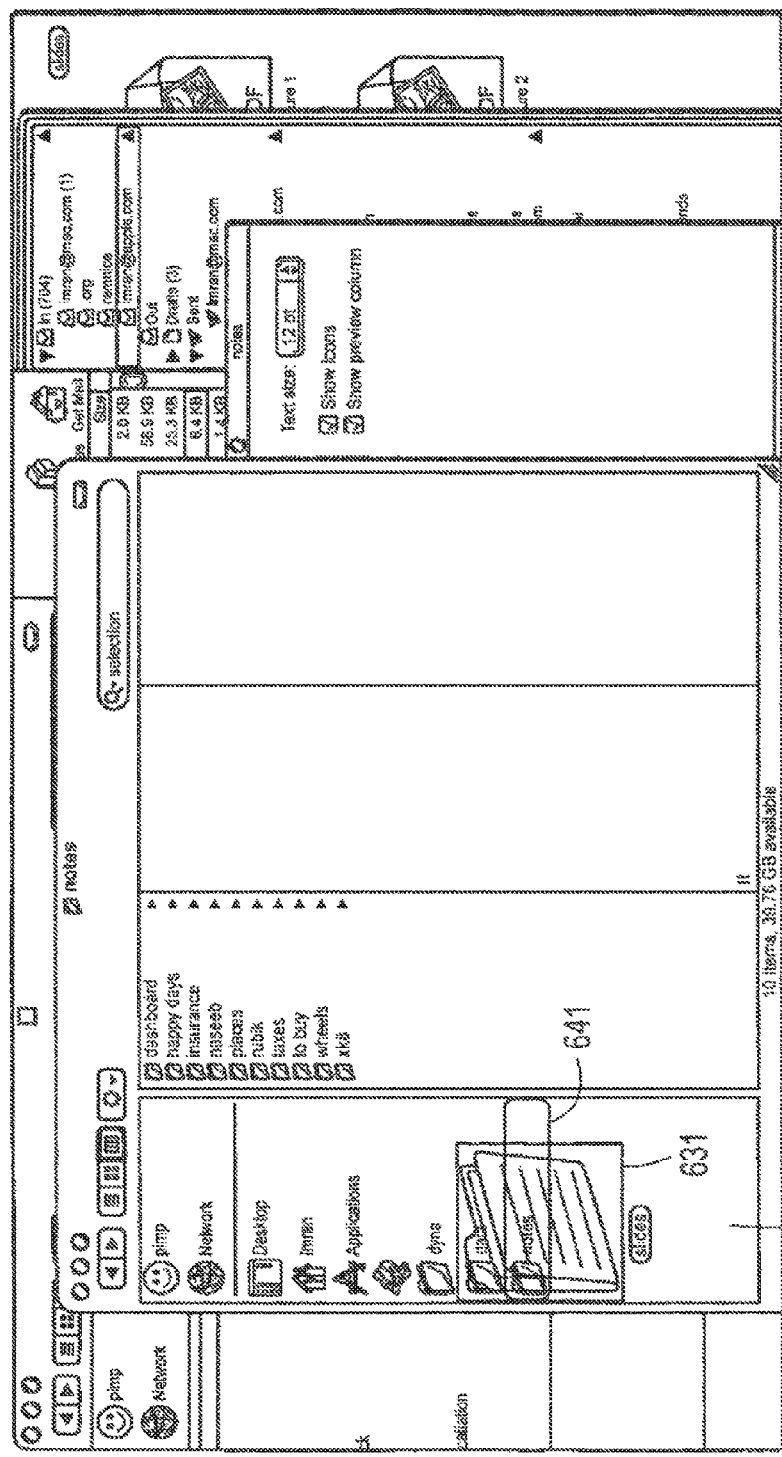

It may be desirable in at least certain embodiments to provide feedback to a user when the user interacts with objects within a user configurable portion. This feedback may take a variety of different forms and certain examples of those forms are provided here. In particular, a method for providing feedback is shown in FIG. 6A and examples of feedback within a side bar are shown in the images of graphical user interfaces shown in FIGS. 6B, 6C, 6D, and 6E. The method of FIG. 6A may begin in operation 601 in which the system displays one or more objects, such as files or folders or application programs, in a user configurable portion of a window, such as a side bar of a window of a file management system user interface. The system in operation 603 receives a user input which selects an item, such as a file or a folder, and which indicates placement of the item within the user configurable portion. This may occur by the user selecting the object by positioning a cursor over it and pressing a button and maintaining the button in a depressed state and then moving the cursor and the object in a dragging operation over the particular selected object in the side bar. The system responds in operation 605 by displaying feedback with respect to the placement. The appearance of the feedback will depend upon, in this example, the particular placement. For example, the feedback may indicate whether the selected item can be deposited or not deposited into the selected object or it may indicate that the selected item may be added to the side bar at an indicated location. FIG. 6B and FIG. 6C show two examples of feedback which show where a selected object will be added to the side bar 616 of the window 615. In particular, a file (Picture 1) 617 has been dragged into the side bar region 616. In the case of FIG. 6B, the file represented by the icon 617 has been positioned for placement as indicated by line 618 between the object 622 and the object 621 within the side bar 616 as a result of dragging the icon of the file from the desktop into the side bar 616. In the case of FIG. 6C, the user has dragged the icon object 617 into the lower portion of the side bar 616 such that its placement within the side bar 616 will be below folder objects 620 and 619 as indicated by the placement line 628 shown in FIG. 6C. Thus, both FIGS. 6B and 6C show examples of feedback indicating the location where a particular object will be placed into a side bar. FIG. 6D shows an example of feedback in which an object cannot be deposited into another object. In particular, the Slides folder 631 has been dragged from the desktop over the folder object 621 and this particular feedback 632 shows that the dyna folder cannot accept the Slides folder. This may result from an incompatibility of user permissions which prevents one user from mingling his or her data with another user's data. FIG. 6E shows the feedback 641 which indicates that the Notes folder can accept the Slides folder. In this case the user is given feedback that indicates the release of the Slides folder at the end of the drag of the Slides folder 631 will cause the Slides folder to be placed within the Notes folder (resulting in an updating of the contents of the Notes folder which currently includes folders such as "Dashboard" etc.) as shown in FIG. 6E.

Figure 7A:
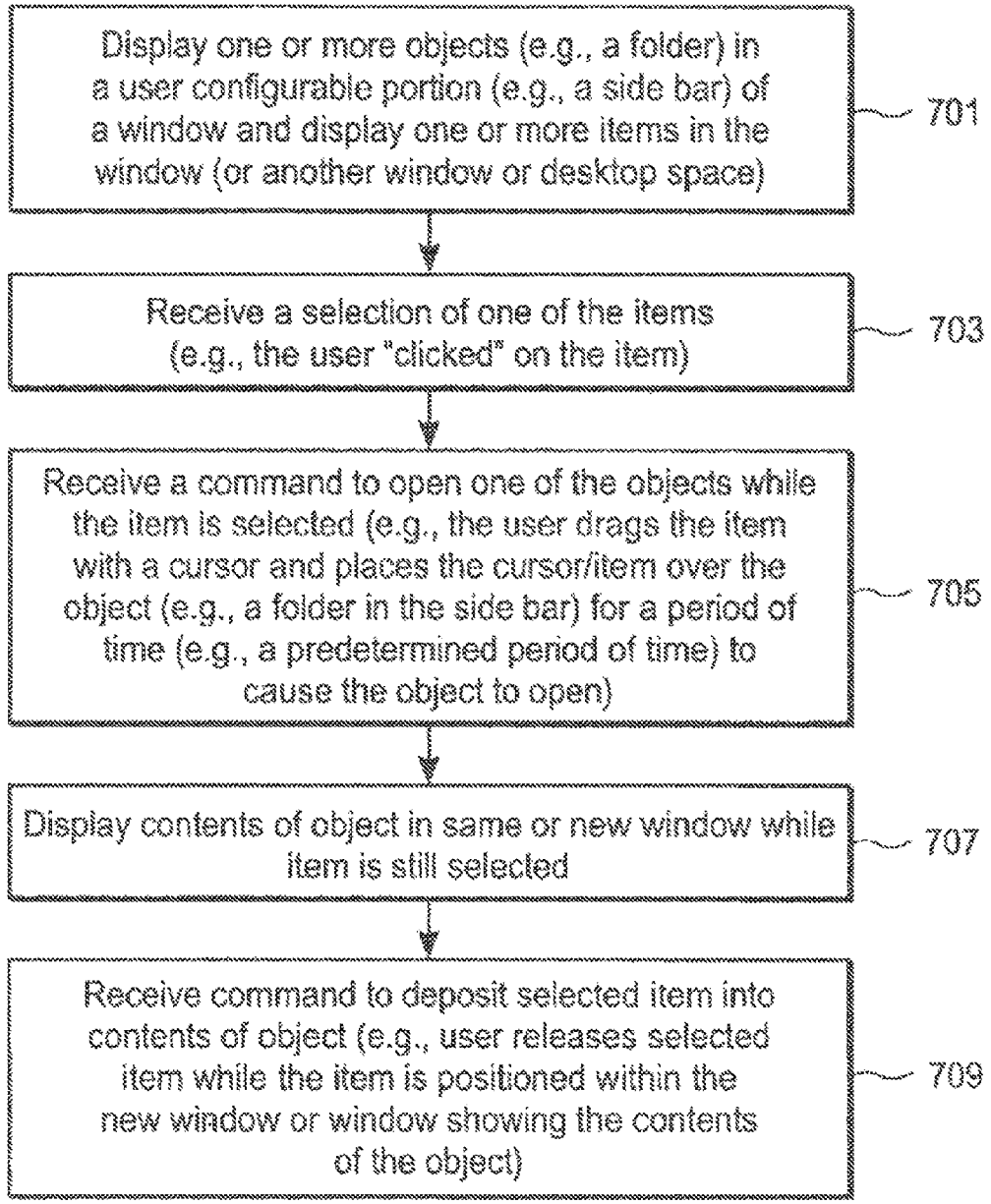
FIG. 7A shows a method in one exemplary embodiment in which an object within the user configurable portion can be opened while maintaining a selection of a particular item; in one example this may be a spring-loaded folder.

At least some of the objects in a user configurable portion may be objects which represent enclosures, such as folders or subdirectories, in a file management system user interface. In certain embodiments, these enclosures may be spring-loaded enclosures and have some or all of the properties of a spring-loaded enclosure, such as those described in U.S. Pat. No. 6,307,545, which patent is hereby incorporated herein by reference in its entirety. This functionality allows the user to open a folder in the side bar by selecting an object on the desktop or in another window or in the same window which includes the side bar and dragging that selected item to a particular folder in the side bar. When the user pauses ("hovers"), gestures, or rolls over a spot on the folder during the drag, a new window corresponding to the folder may be opened or the contents of that folder may be displayed in the same existing window rather than displaying the contents in the new window. This allows the user to browse inside an enclosure and possibly open a hierarchy of enclosures contained within the newly opened enclosure during the drag operation. Thus the user has access to the entire storage system hierarchy during a drag operation. By using the spring-loaded enclosure mechanism, the user is free to browse while dragging, rather than being forced to set up source and destination windows before a drag begins. This greatly improves the basic copy and move functions provided by file management system user interfaces based on windows and icons. FIG. 7A shows an exemplary method of providing spring-loaded objects within a user configurable portion, and FIGS. 7B, 7C, 7D, and 7E show examples of one implementation of spring-loaded folders within a side bar of a window for a file management user interface.

Figure 7B:
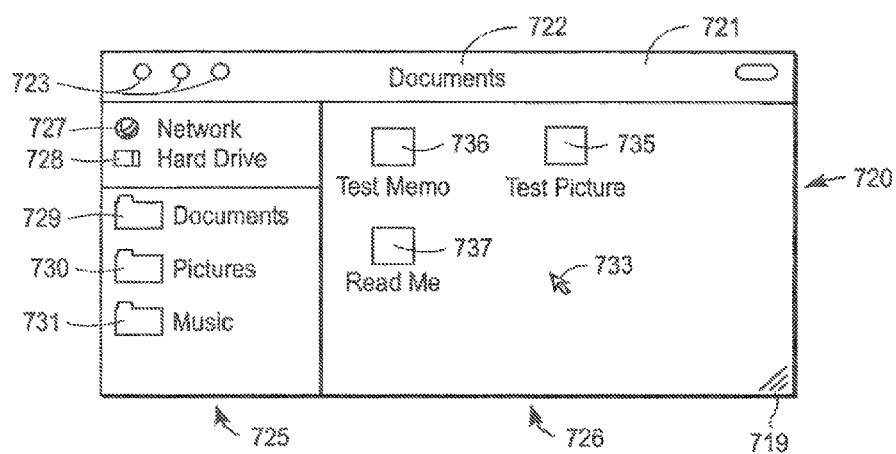
FIGS. 7B, 7C, 7D, 7E, 7F, 7G, and 7H show an example of a spring-loaded folder in a user configurable portion of a window.

The method of FIG. 7A may begin in operation 701 in which the system displays one or more objects in a user configurable portion, such as a side bar of a window, and the system also displays one or more items in the window (or another window or the desktop space). FIG. 7B shows an example of such a display from operation 701. In particular, a window 720 includes a side bar region 725, a tool bar 721, a title 722, and a content display region 726. Also displayed with the window 720 are folders 729, 730, and 731 which have been previously placed into the user configurable portion of the side bar 725. The side bar 725 also includes a portion which is specified by the system which includes an icon or object 728 which represents the topmost directory of a storage device which in this case is the hard drive of the computer system, and an object 726 which represents a pointer or other mechanism to cause the display of elements, such as other computers or printers on the network which may be coupled to the computer system. The window 720 also includes window controls 723 which may be used to close the window or minimize the window or maximize the size of the window which is known in the art. The window 720 also includes a resize control 719 which may operate in a conventional manner. It will be appreciated that in alternative embodiments, the arrangement and type of window controls may be different while still providing for a user configurable portion. The content display region 726 shows the content of the Documents folder, which in this case includes three files, each represented by one of the three icons 735, 736, and 737. A cursor 733 is also shown in the content display region 726. The display of the window 720 shown in FIG. 7B may result from the user having already selected the folder 729 within the side bar 725 in order to cause the content display region 726 to show the contents of the Documents folder. It will be appreciated that other procedures may be used to obtain the same resulting display, such as, for example, the user may have started at the top of the hierarchy (e.g. the hard drive icon) and drove down through a series of folders to arrive at the contents of the Documents folder. The user may realize that the Test Picture file represented by icon 735 is misplaced and needs to be moved into the Pictures folder 730. This may be accomplished by simply selecting the icon 735 and dragging it over the area in the side bar of the Pictures folder 730 and releasing the icon at the end of the drag. This operation, which has been described above, would result in the placement of the Test Picture file within the Pictures folder 730. However, it may be that the user wants to put the Test Picture file within a folder which is itself within the Pictures folder or the user is not certain that the Pictures folder is ultimately the proper folder and would rather see the contents of the Pictures folder before deciding on depositing the Test Picture file into the Pictures folder.

Figure 7C:
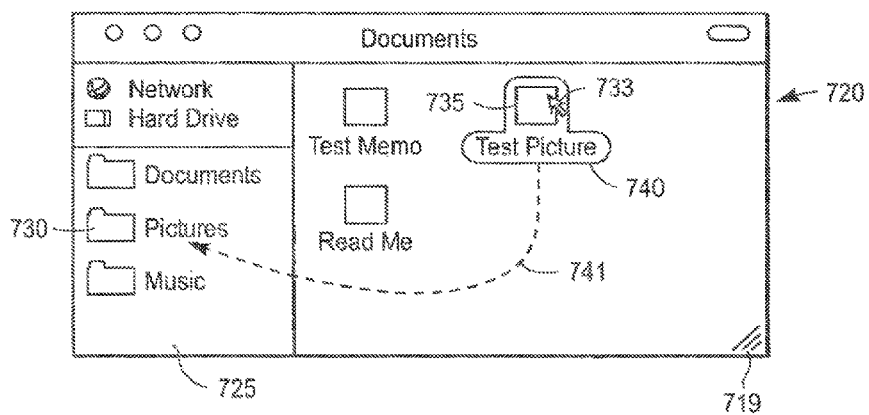
Figure 7D:
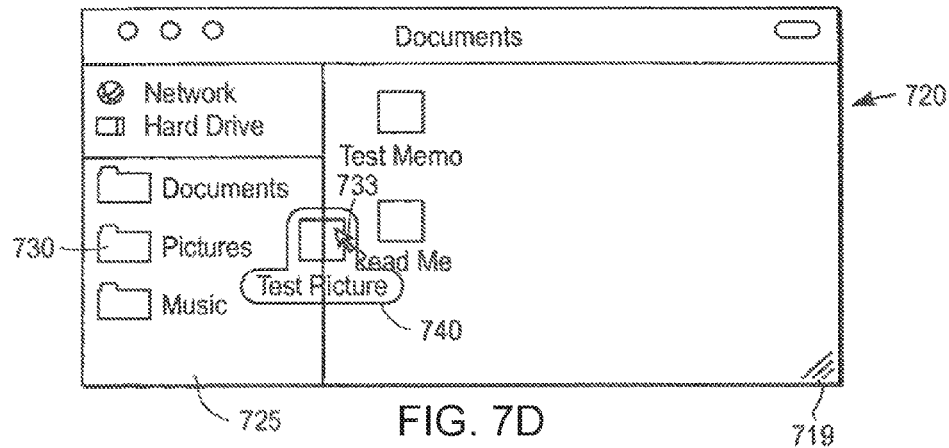
Figure 7E:
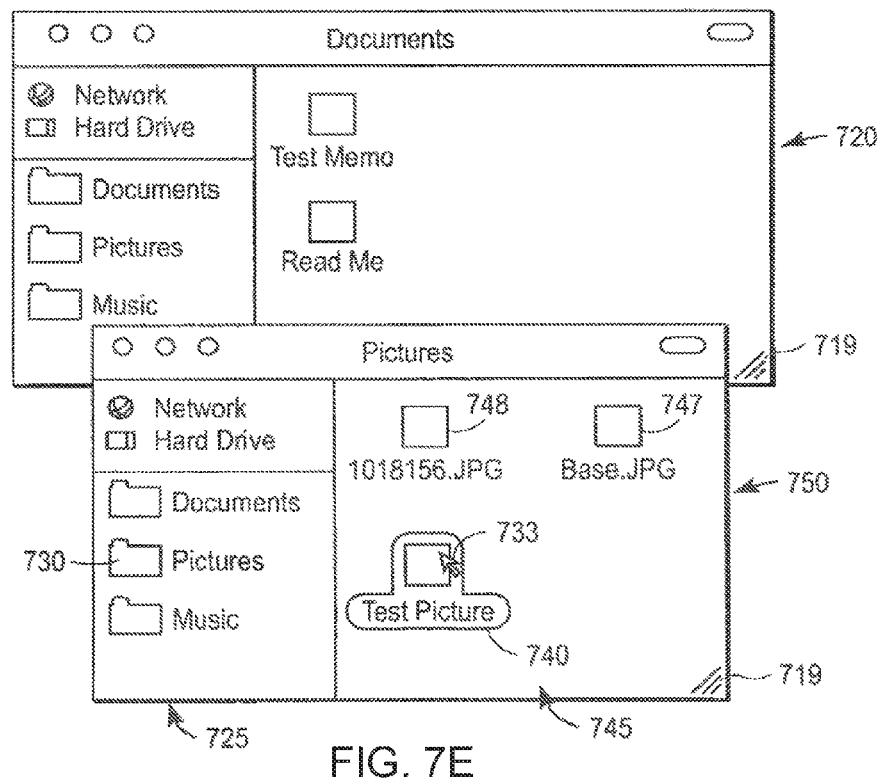
Figure 7F:
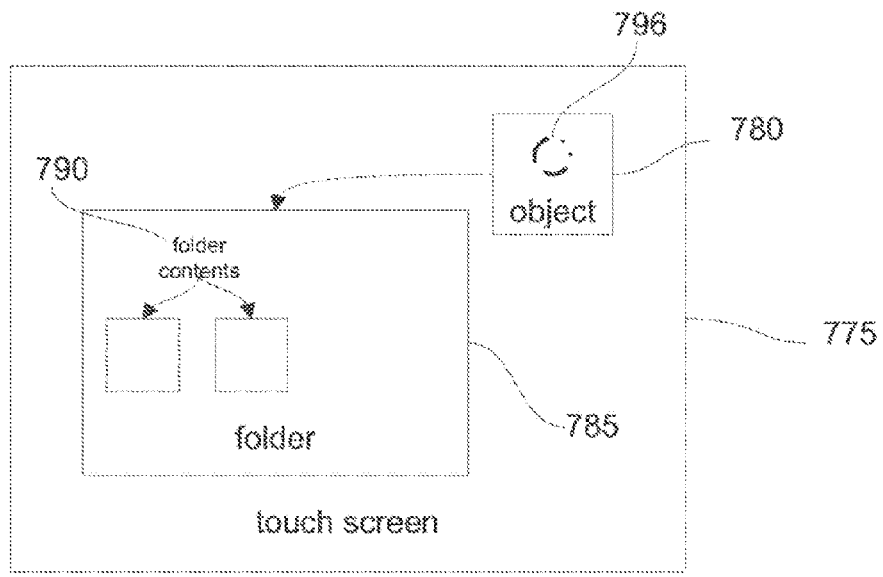
Figure 7G:
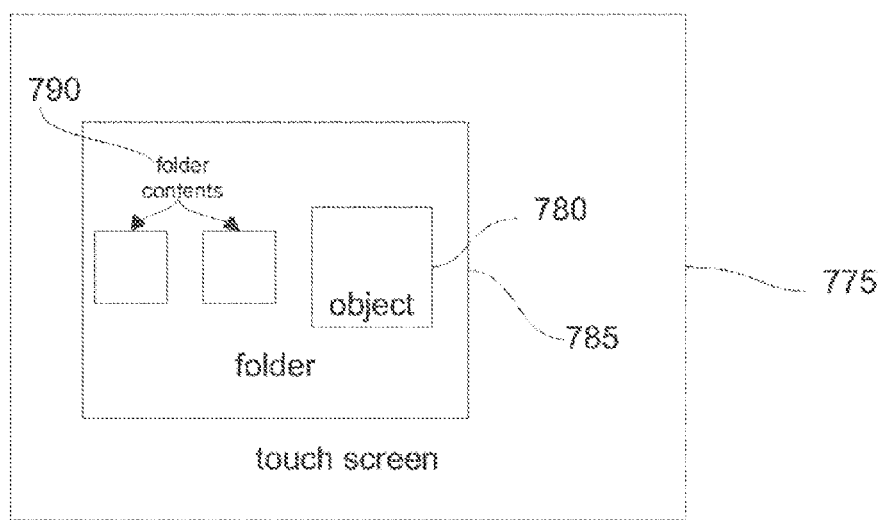
Figure 7H:
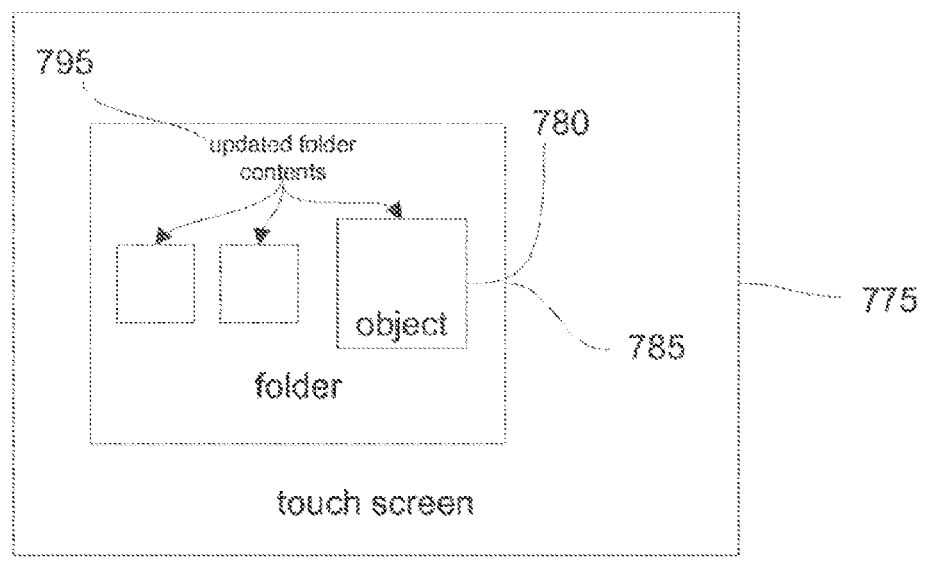

FIG. 7C shows the selection by the user of the Test Picture icon 735, which is also shown as operation 703 in FIG. 7A, in which the system receives a selection of one of the items. The selection may occur by the user's positioning of the cursor 733 over or relative to the icon 735 and pressing and holding a button, such as a mouse's button, to maintain a selection state of the icon. This selection state is shown by outline 740 which provides feedback to the user that the icon 735 has been selected. The user may then drag the icon 735 with the cursor 733 in a well-known manner along a path, such as the path 741 as shown in FIG. 7C. It will be appreciated that other mechanisms may be used to select the icon 735 and cause it to be moved, such as the use of a touch screen rather than a cursor control device or a voice command which operates with a speech recognition system. FIGS. 7F, 7G, and 7H show examples of one implementation using a touch screen. FIG. 7F shows folder contents 790 of folder 785 on touch screen 775. Touch screen 775 also includes object 780. Moving object 780 into folder 785 on touch screen 775 may be accomplished by selecting object 780 and dragging it over folder 785. Releasing object 780 at the end of the drag would result in the placement of object 780 into folder 785. Selecting (e.g., pressing or touching 796) and holding object 780 maintains the selection state of object 780. The selection state provides feedback that object 780 has been selected. FIG. 7G shows the result of releasing object 780 over folder 785 on touch screen 775. FIG. 7H shows contents of folder 785 including object 780 (e.g., updated contents 795), on touch screen 775.

The method continues in operation 705 in which the system receives a command to open one of the objects in the user configurable portion while the previously selected element remains selected. This may occur by determining that the user has positioned the item at the end of the drag operation near the object in the side bar. The user's actions may be interpreted based upon the reduction in movement velocity of the selected icon relative to the object in the side bar or by other techniques (e.g. pressing a button on a keyboard or by speaking a command) which indicate a command to open the object in the user configurable portion while the drag operation continues. FIG. 7D shows the window 720 after the user has dragged the icon 735 into a region occupied by the folder 730 in the side bar 725. After the system determines that the user has provided a command to open the Pictures folder 730 as a spring-loaded enclosure, the system responds in operation 707 by displaying the contents of the object in the same or a new window while the item, in this case, the Test Picture icon or file 735 remains selected. FIG. 7E shows the result of a new window being opened which shows the contents of the Pictures folder 735. It can be seen that the user has moved the selected item, the Test Picture icon or file 735, into the content display region 745 which shows the content of the Pictures folder 730. The user may then decide to deposit the icon into the content display region 735, thereby moving the Test Picture file from the Documents folder to the Pictures folder, or the user may search for a folder which is within the Pictures folder and deposit the Test Picture icon into that folder. The user may deposit the selected item by releasing the mouse's button or by otherwise providing a command to indicate that the selected item is to be deposited into the selected location, as shown in operation 709 of FIG. 7A. If the user decides to not deposit the Test Picture icon into the Pictures folder, the user may move, as a continuing part of the drag, the Test Picture icon out of the window 750 and toward another region in the display, thereby causing the window 750 to close automatically, for example, in the manner described in U.S. Pat. No. 6,307,545.

It will be appreciated that numerous modifications may be made to the method of FIG. 7A and to the user interface which accompanies this method. For example, the user may be able to turn off the spring-loaded feature completely or may be able to change the system's reaction based on the amount of time the user causes the selected item to hover over a folder within the side bar of a window. For example, the user may increase the time that is required for the hover operation in order to prevent accidental opening of enclosures. Furthermore, it will be appreciated that only some of the features and functionality of spring-loaded enclosures may be provided for folders within the side bar of a window in certain embodiments.

Figure 8A:
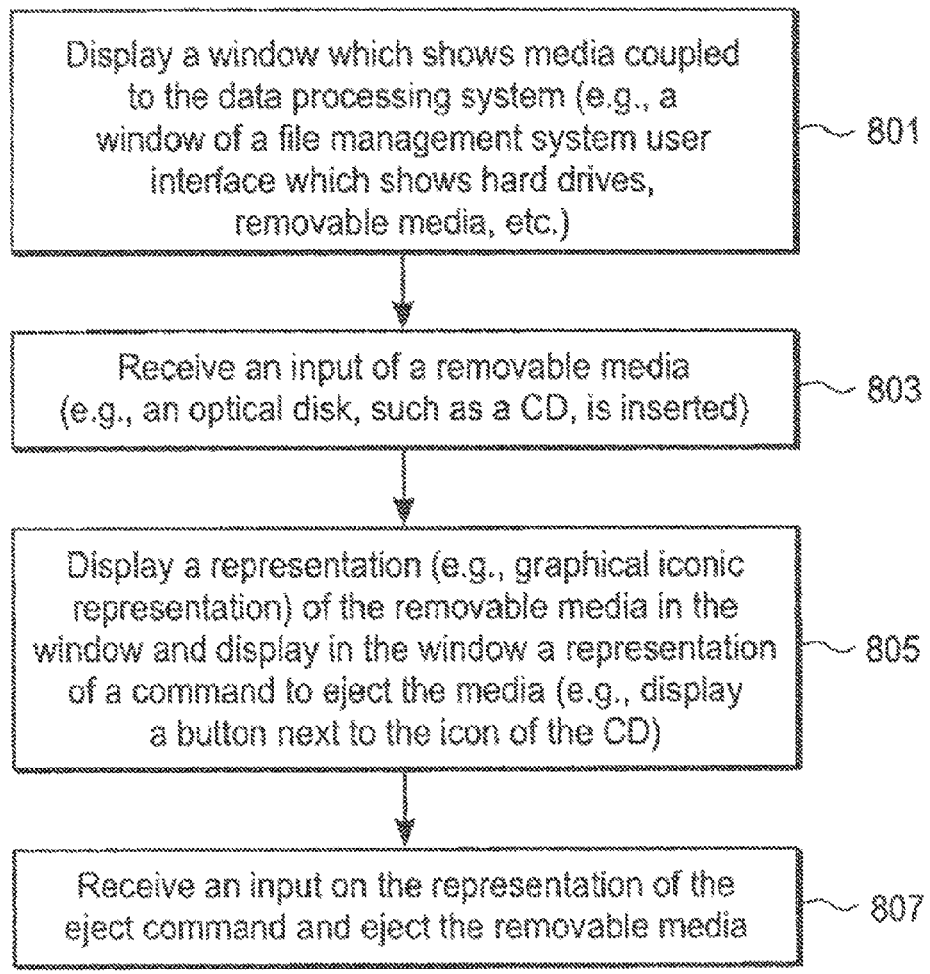
FIG. 8A shows a method of implementing a command to eject a removable media.
Figure 8B:
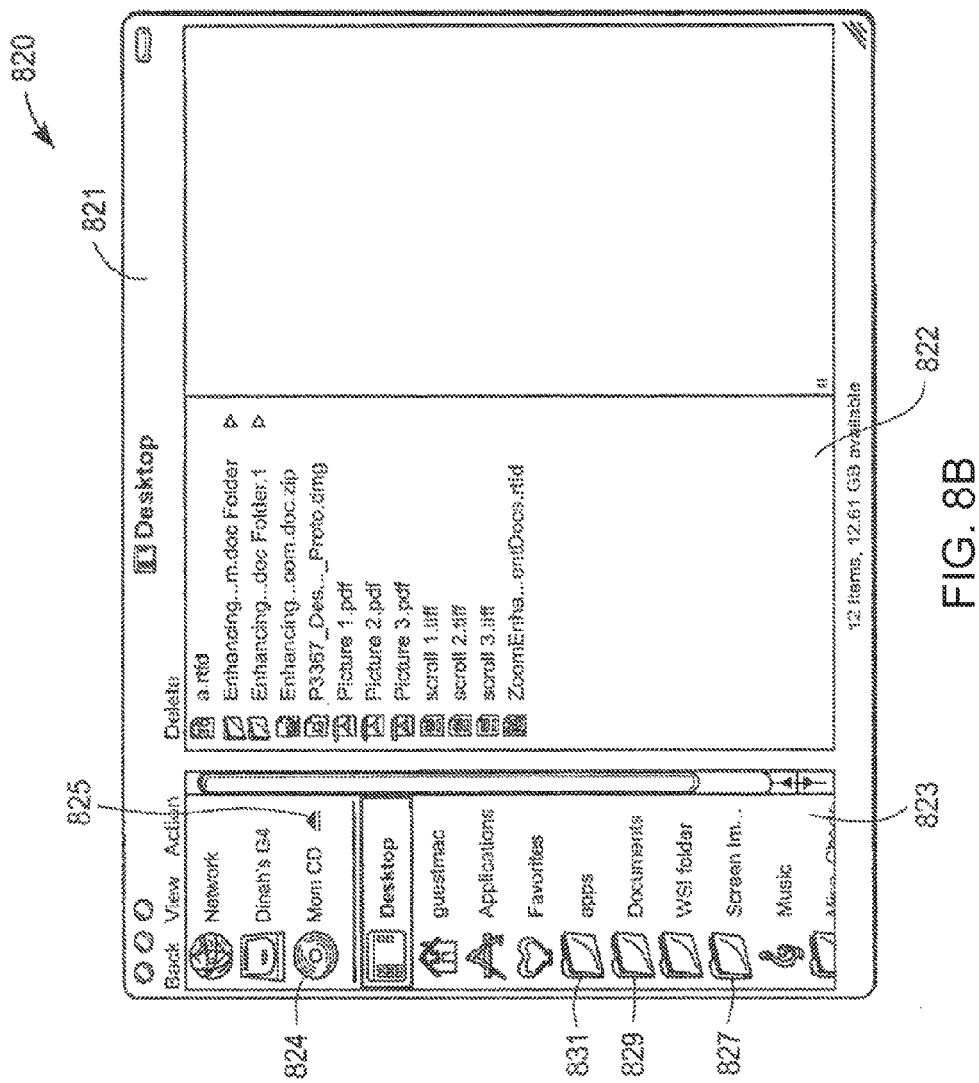
FIG. 8B is an exemplary user interface of this method.

FIGS. 8A and 8B show another embodiment of a user configurable portion which displays removable media with a graphical command which may be used to eject the media. In operation 801 of FIG. 8A, a window is displayed by the system, and this window shows media which is coupled to the data processing system. The window may be a window of a file management system user interface which shows hard drives, removable media such as CD ROM or CD-R disks or DVD disks, etc. FIG. 8B shows a window 820 which includes a side bar region 823 having a variety of objects in the user configurable portion of the side bar and also having objects in a portion of the side bar which is specified by the system. That portion includes a representation of a hard drive as well as a CD ("Mom CD"), which is a form of a removable medium, with its icon 824 and an eject command button 825 disposed next to the name of the icon in the upper portion of the side bar 823. The window 820 also includes a tool bar 821 and a content display region 822 which shows the content of the desktop in this figure. This figure shows the window 820 after the system has received an input of a removable media in operation 803. This may result from an operation in which the user inserts a CD into the computer system. The window of FIG. 8B also shows the result of the operation 805 in which a representation of a removable media is shown in the window with a representation of a command to eject the media. In the case of FIG. 8B, this command is the eject button 825. If the user selects that eject button (for example, by positioning a cursor over the button on the display and pressing and releasing a mouse button or other physical button) then the computer will receive, in operation 807 of FIG. 8A, an input on the representation of the eject command and cause the removable media to be ejected. This allows a user to directly eject the removable medium without having to first cause a menu (with many possible, selectable options) to be displayed and then selecting an eject command from the menu. The direct selection or activation of the button (e.g. by positioning the cursor, using a cursor control device, near the button on the display and then pressing and releasing a button) is much more direct and less complicated. It will be appreciated that there are numerous alternative ways to select the button which represents the eject command.

The eject command button is one example of a more general method in which an object (e.g. a removable medium) in a computer system has a group of possible commands which may apply to the object (e.g. "open" CD or "show properties/Information" CD or "burn" CD) but an icon for only the most commonly used command for the object is associated with an icon of the object so that this most commonly used command is directly available, without having to select from a menu of possible commands, through the selection of the icon for this most commonly used command.

Figure 10:
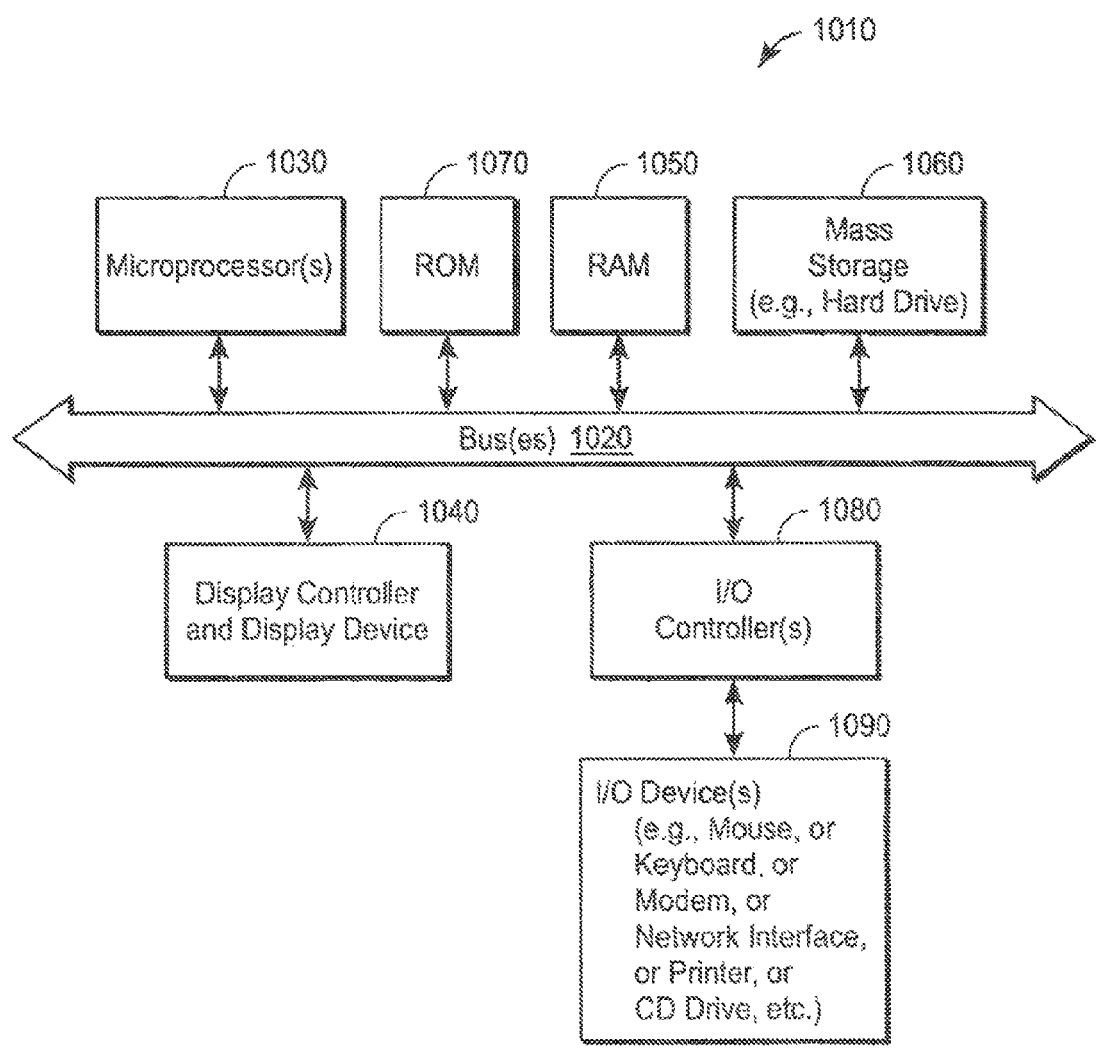
FIG. 10 shows a block diagram example of a data processing system which may be used with the various embodiments described herein.

FIG. 10 shows one example of a typical computer system which may be used with the present invention. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 10 may, for example, be a Macintosh computer from Apple Computer, Inc.

As shown in FIG. 10, the computer system 1010, which is a form of a data processing system, includes a bus 1020 which is coupled to a microprocessor(s) 1030 and a ROM (Read Only Memory) 1070 and volatile RAM 1050 and a non-volatile memory 1060. The microprocessor 1030 may be a G3 or G4 microprocessor from Motorola, Inc. or one or more G5 microprocessors from IBM. The bus 1020 interconnects these various components together and also interconnects these components 1030, 1070, 1050, and 1060 to a display controller and display device 1040 and to peripheral devices such as input/output (I/O) devices which may be mice, keyboards, modems, network interfaces, printers and other devices which are well known in the art. Typically, the input/output devices 1090 are coupled to the system through input/output controllers 1080. The volatile RAM (Random Access Memory) 1050 is typically implemented as dynamic RAM (DRAM) which requires power continually in order to refresh or maintain the data in the memory. The mass storage 1060 is typically a magnetic hard drive or a magnetic optical drive or an optical drive or a DVD RAM or other types of memory systems which maintain data (e.g. large amounts of data) even after power is removed from the system. Typically, the mass storage 1060 will also be a random access memory although this is not required. While FIG. 10 shows that the mass storage 1060 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1020 may include one or more buses connected to each other through various bridges, controllers and/or adapters as is well known in the art. In one embodiment the I/O controller 1080 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 1070, RAM 1050, mass storage 1060 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1030.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine-readable storage medium storing one or more programs for execution by one or more processors of a computing device, the one or more programs including instructions that when executed cause the computing device to:

display a user interface that includes a closed representation of a folder on a touch screen display of the computing device, wherein:
        the folder includes one or more objects,
        displaying the closed representation of the folder comprises displaying the closed representation of the folder in a user-configurable side bar of the user interface displayed on the touch screen display, and
        the user-configurable side bar includes one or more other side bar objects;
    display an object on the touch screen display that is not included in the folder and is not included in the user-configurable side bar;
    receive a touch input on the touch screen display that selects the object not included in the folder and not included in the user-configurable side bar and drags the selected object over a respective portion of the user-configurable side bar;
    while the touch input continues to drag the selected object over the respective portion of the user-configurable side bar, updating the user interface based on the dragging of the selected object over the respective portion of the user-configurable side bar, including:
        in accordance with a determination that the selected object has hovered over the folder for at least a required amount of time, displaying on the touch screen display an open representation of the folder that is different from the closed representation of the folder; and
        in accordance with a determination that the selected object has hovered between the folder and a respective side bar object in the user-configurable side bar, updating the appearance of the user-configurable side bar to indicate a placement location on the user-configurable side bar for the selected object;
    after updating the user interface based on the dragging of the selected object over the respective portion of the user-configurable side bar, detect liftoff of the touch input from the touch screen display; and
    in response to detecting liftoff of the touch input from the touch screen display:
        in accordance with a determination that the selected object was over the folder when the liftoff of the touch input was detected, update the folder, wherein the folder is automatically updated when the touch input is no longer received while the selected object is over the folder, and wherein the updated folder includes the selected object; and display the updated folder on the touch screen display; and in accordance with a determination that the selected object was between the folder and the respective side bar object in the user-configurable side bar when the liftoff of the touch input was detected, insert a representation of the selected object into the user-configurable side bar between the folder and the respective side bar object.

2. The non-transitory machine-readable storage medium of claim 1, wherein displaying the open representation of the folder includes displaying contents of the folder, wherein updating the folder includes updating the contents of the folder, and wherein displaying the updated folder includes displaying the updated contents of the folder.

3. The non-transitory machine-readable storage medium of claim 1, wherein displaying the folder includes displaying at least some of the contents of the folder, wherein updating the folder includes updating the contents of the folder, and wherein displaying the updated folder includes displaying at least some of the updated contents of the folder.

4. The non-transitory machine-readable storage medium of claim 1, wherein selecting an object includes providing feedback indicating the selection state of the object.

5. The non-transitory machine-readable storage medium of claim 1, further comprising instructions configured to cause the computing device to:
receive a touch input to change the folder display to an open state.

6. The non-transitory machine-readable storage medium of claim 5, further comprising instructions configured to cause the computing device to:
receive a new touch input on the touch screen that selects an object in the folder and drags the object out of the folder; and
update the folder, wherein the folder is automatically updated when the touch input is no longer received while the object is outside of the folder, and wherein the updated folder does not include the selected object.

7. The non-transitory machine-readable storage medium of claim 6, wherein displaying the folder includes displaying contents of the folder, wherein updating the folder includes updating the contents of the folder, and wherein displaying the updated folder includes displaying the updated contents of the folder.

8. The non-transitory machine-readable storage medium of claim 6, wherein displaying the folder includes displaying at least some of the contents of the folder, wherein updating the folder includes updating the contents of the folder, and wherein displaying the updated folder includes displaying at least some of the updated contents of the folder.

9. A computer-implemented system, comprising:
one or more processors;
one or more non-transitory computer-readable storage mediums containing instructions configured to cause the one or more processors to perform operations including:
displaying a user interface that includes a closed representation of a folder on a touch screen display, wherein:
the folder includes one or more objects,
displaying the closed representation of the folder comprises displaying the closed representation of the folder in a user-configurable side bar of the user interface displayed on the touch screen display, and the user-configurable side bar includes one or more other side bar objects;
displaying an object on the touch screen display that is not included in the folder and is not included in the user-configurable side bar;
receiving a touch input on the touch screen display that selects the object not included in the folder and not included in the user-configurable side bar and drags the selected object over a respective portion of the user configurable side bar;
while the touch input continues to drag the selected object over the respective portion of the user-configurable side bar, updating the user interface based on the dragging of the selected object over the respective portion of the user-configurable side bar, including:
in accordance with a determination that the selected object has hovered over the folder for at least a required amount of time, displaying on the touch screen display an open representation of the folder that is different from the closed representation of the folder; and
in accordance with a determination that the selected object has hovered between the folder and a respective side bar object in the user-configurable side bar, updating the appearance of the user-configurable side bar to indicate a placement location on the user-configurable side bar for the selected object;
after updating the user interface based on the dragging of the selected object over the respective portion of the user-configurable side bar, detecting liftoff of the touch input from the touch screen display; and
in response to detecting liftoff of the touch input from the touch screen display:
in accordance with a determination that the selected object was over the folder when the liftoff of the touch input was detected, updating the folder, wherein the folder is automatically updated when the touch input is no longer received while the selected object is over the folder, and wherein the updated folder includes the selected object; and displaying the updated folder on the touch screen display; and
in accordance with a determination that the selected object was between the folder and the respective side bar object in the user-configurable side bar when the liftoff of the touch-input was detected, inserting a representation of the selected object into the user-configurable side bar between the folder and the respective side bar object.

10. The system of claim 9, wherein displaying the open representation of the folder includes displaying contents of the folder, wherein updating the folder includes updating the contents of the folder, and wherein displaying the updated folder includes displaying the updated contents of the folder.

11. The system of claim 9, wherein displaying the folder includes displaying at least some of the contents of the folder, wherein updating the folder includes updating the contents of the folder, and wherein displaying the updated folder includes displaying at least some of the updated contents of the folder.

12. The system of claim 9, wherein selecting an object includes providing feedback indicating the selection state of the object.

13. The system of claim 9, further comprising instructions configured to cause the one or more processors to perform operations including:

receiving a new touch input on the touch screen selecting an object in the folder and maintaining the selection while dragging the object out of the folder; and updating the folder, wherein the folder is automatically updated when the touch input is no longer received while the object is outside of the folder, and wherein the updated folder does not include the selected object.

14. The system of claim 13, wherein displaying the folder includes displaying contents of the folder, wherein updating the folder includes updating the contents of the folder, and wherein displaying the updated folder includes displaying the updated contents of the folder.

15. The system of claim 13, wherein displaying the folder includes displaying at least some of the contents of the folder, wherein updating the folder includes updating the contents of the folder, and wherein displaying the updated folder includes displaying at least some of the updated contents of the folder.

16. A computer-implemented method, comprising:
displaying a user interface that includes a closed representation of a folder on a touch screen display, wherein:
the folder includes one or more objects,
displaying the closed representation of the folder comprises displaying the closed representation of the folder in a user-configurable side bar of the user interface displayed on the touch screen display, and the user-configurable side bar includes one or more other side bar objects;
displaying an object on the touch screen display that is not included in the folder and is not included in the user-configurable side bar;
receiving a touch input on the touch screen display that selects the object not included in the folder and not included in the user-configurable side bar and drags the selected object over a respective portion of the user configurable side bar;
while the touch input continues to drag the selected object over the respective portion of the user-configurable side bar, updating the user interface based on the dragging of the selected object over the respective portion of the user-configurable side bag, including:
in accordance with a determination that the selected object has hovered over the folder for at least a required amount of time, displaying on the touch screen display an open representation of the folder that is different from the closed representation of the folder; and
in accordance with a determination that the selected object has hovered between the folder and a respective side bar object in the user-configurable side bar, updating the appearance of the user-configurable side bar to indicate a placement location on the user-configurable side bar for the selected object;
after updating the user interface based on the dragging of the selected object over the respective portion of the user-configurable side bar, detecting liftoff of the touch input from the touch screen display; and
in response to detecting liftoff of the touch input from the touch screen display:
in accordance with a determination that the selectable object was over the folder when the liftoff of the touch input was detected, updating the folder, wherein the folder is automatically updated when the touch input is no longer received while the object is over the folder; and displaying the updated folder on the touch screen display; and in accordance with a determination that the selected object was between the folder and the respective side bar object in the user-configurable side bar when the liftoff of the touch input was detected, inserting a representation of the selected object into the user-configurable side bar between the folder and the respective side bar object.

17. The method of claim 16, wherein displaying the open representation of the folder includes displaying contents of the folder, wherein updating the folder includes updating the contents of the folder, and wherein displaying the updated folder includes displaying the updated contents of the folder.

18. The method of claim 16, wherein displaying the folder includes displaying at least some of the contents of the folder, wherein updating the folder includes updating the contents of the folder, and wherein displaying the updated folder includes displaying at least some of the updated contents of the folder.

19. The method of claim 16, wherein selecting an object includes providing feedback indicating the selection state of the object.

20. The method of claim 16, including:
receiving a touch input to change the folder display to an open state.

21. The method of claim 20, including:
detecting a new touch input on the touch screen display that selects on object in the folder and drags the object out of the folder;
updating the folder, wherein the folder is automatically updated when the touch input is no longer received while the object is outside of the folder, and wherein the updated folder does not include the selected object.

22. The method of claim 21, wherein displaying the folder includes displaying contents of the folder, wherein updating the folder includes updating the contents of the folder, and wherein displaying the updated folder includes displaying the updated contents of the folder.

23. The method of claim 21, wherein displaying the folder includes displaying at least some of the contents of the folder, wherein updating the folder includes updating the contents of the folder, and wherein displaying the updated folder includes displaying at least some of the updated contents of the folder.

24. A system, comprising:
a touch screen display;
one or more processors;
memory; and
one or more programs, wherein the one or more programs are stored in the memory and configured to be executed by the one or more processors, the one or more processors including instructions for:
displaying a user interface that includes a closed representation of a folder on the touch screen display, wherein:
the folder includes one or more objects,
displaying the closed representation of the folder comprises displaying the closed representation of the folder in a user-configurable side bar of the user interface displayed on the touch screen display, and the user-configurable side bar includes one or more other side bar objects;
displaying an application launch icon on the touch screen display that is not included in the folder and is not included in the user-configurable side bar;

detecting a contact on the touch screen display, the contact selecting the application launch icon and moving the application launch icon over a respective portion of the user configurable side bar;

while the contact continues to drag the application launch icon over the respective portion of the user-configurable side bar, updating the user interface based on the dragging of the selected application launch icon over the respective portion of the user-configurable side bar, including:

in accordance with a determination that the selected application launch icon has hovered over the folder for at least a required amount of time, displaying on the touch screen display an open representation of the folder that is different from the closed representation of the folder; and in accordance with a determination that the selected application launch icon has hovered between the folder and a respective side bar object in the user-configurable side bar, updating the appearance of the user-configurable side bar to indicate a placement location on the user-configurable side bar for the selected application launch icon;

after updating the user interface based on the dragging of the selected application launch icon over the respective portion of the user-configurable side bar, detecting liftoff of the contact from the touch screen display; and in response to detecting liftoff of the contact from the touch screen display:

in accordance with a determination that the selectable object was over the folder when the liftoff of the contact was detected, updating the contents of the folder to include the selected application launch icon when the detected contact is lifted from the touch screen display; and in accordance with a determination that the selected application launch icon was between the folder and the respective side bar object in the user-configurable side bar when the liftoff of the contact was detected, inserting the application launch icon into the user-configurable side bar between the folder and the respective side bar object.

25. The non-transitory machine-readable storage medium of claim 1, wherein displaying the open representation of the folder includes displaying a plurality of objects within a boundary that represents the folder; and displaying the closed representation of the folder does not include displaying the plurality of objects within the boundary that represents the folder.

* * * * *

UNITED STATES PATENT AND TRADEMARK OFFICE
CERTIFICATE OF CORRECTION

PATENT NO. : 9,542,081 B2  
APPLICATION NO. : 14/204977  
DATED : January 10, 2017  
INVENTOR(S) : Ording et al.

Page 1 of 1

It is certified that error appears in the above-identified patent and that said Letters Patent is hereby corrected as shown below:

In the Claims

Claim 16, Column 19, Line 41, please delete "side bag, including" and insert --side bar, including--;

Claim 21, Column 20, Line 27, please delete "selects on object" and insert --selects an object--;

Claim 21, Column 20, Line 28, please delete "of the folder;" and insert --of the folder; and--.

Signed and Sealed this  
Fourth Day of April, 2017

Michelle K. Lee  
*Director of the United States Patent and Trademark Office*